United States Patent [19]

Heller et al.

[11] 3,793,634

[45] Feb. 19, 1974

[54] DIGITAL ANTENNA POSITIONING SYSTEM AND METHOD

[75] Inventors: Robert I. Heller; Francis T. Annulis, both of Baltimore; Walter Jachimski, Lutherville, all of Md.

[73] Assignee: Westinghouse Electric Corporation, Pittsburgh, Pa.

[22] Filed: July 31, 1972

[21] Appl. No.: 276,534

[52] U.S. Cl.............. 343/7.4, 343/5 DP, 343/16 M
[51] Int. Cl............................................... G01s 9/22
[58] Field of Search... 343/5 DP, 7.4, 9, 16 R, 16 M

[56] References Cited
UNITED STATES PATENTS

| | | | |
|---|---|---|---|
| 3,078,455 | 2/1963 | Brainin | 343/7.4 X |
| 3,223,996 | 12/1965 | Voles | 343/5 DP |
| 3,377,470 | 4/1968 | Ausman | 343/16 R X |
| 3,750,174 | 7/1973 | Belluck | 343/7.4 X |

*Primary Examiner*—T. H. Tubbesing
*Attorney, Agent, or Firm*—C. L. O'Rourke

[57] ABSTRACT

A digital system for positioning an antenna of a tracking radar system, particularly of the type employing a driven beam reflector of the type utilized in a cassegrain antenna system, without the use of rate gyros. Signals representing various angular quantities are simultaneously sampled periodically and all preliminary functions such as normalizing are performed before the data is stored. The handling of the data as a block of data eliminates undesirable time skewing and the digital data may be used as a block of data in positioning the radar antenna.

A digital target line-of-sight error signal representing the error between the radar beam line-of-sight and the target line-of-sight in a line-of-sight coordinate system is generated and then referenced to a fixed coordinate system. In a radar system employing an antenna having an axis system corresponding to the beam line-of-sight axis system, the line-of-sight error signal is referenced to the fixed coordinate system by first referencing the error signal to an aircraft axis system and then to the fixed coordinate system to obtain a fixed coordinate referenced error signal. The fixed coordinate referenced line-of-sight error signal may then be employed to generate fixed coordinate referenced line-of-sight error rate and position signals through the use of a predetermined transfer function and an integrator having a predetermined, fixed coordinate system referenced constant of integration. The line-of-sight position signals referenced to the fixed coordinate system may then be used to generate antenna angular pointing error signals which may be used to drive the antenna in a direction tending to null the line-of-sight error signal. In a system employing a driven beam reflecting element such as in a cassegrain system, the rotation affect of the reflector on the beam is taken into account in referencing the line-of-sight error signals to the fixed coordinate system. Moreover, the complex relationship between beam position and reflector position is accounted for in transforming to and from the fixed coordinate system. A method and system for generating line-of-sight angular rate signals for use in fire control systems is also disclosed.

5 Claims, 17 Drawing Figures

FIG. 2a
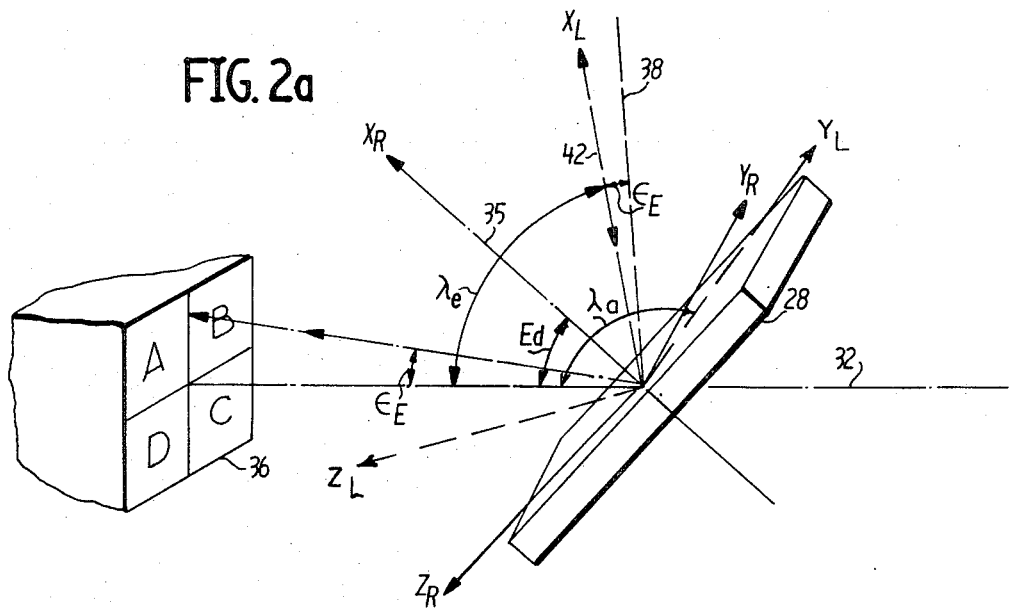
FIG. 2b
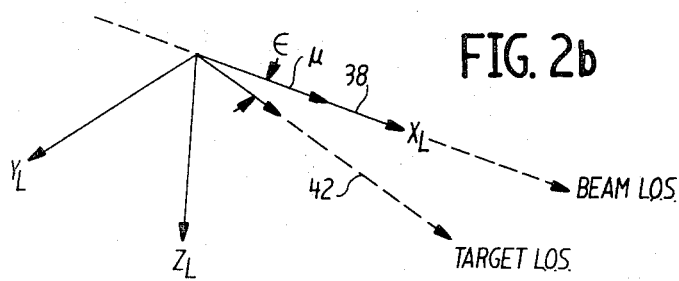
FIG. 2c
FIG. 2d
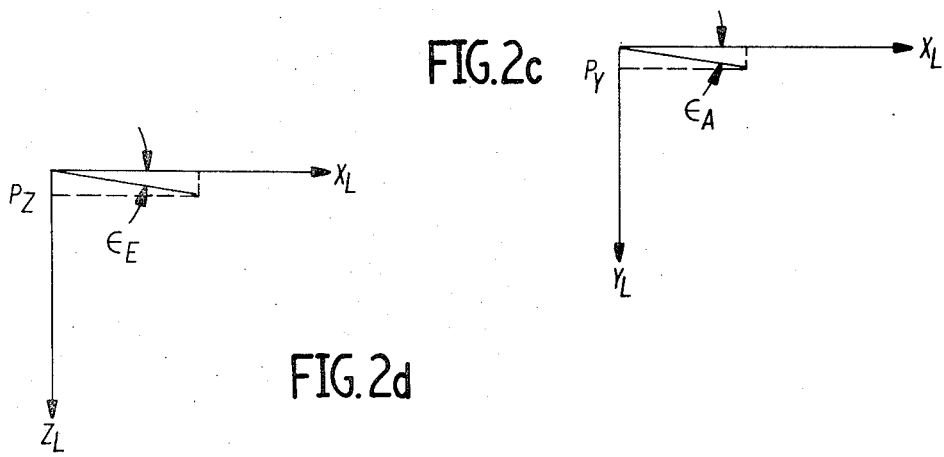

DIGITAL ANTENNA POSITIONING SYSTEM AND METHOD

CROSS REFERENCE TO RELATED APPLICATION

This application is related to copending application Ser. No. 276,344 filed July 31, 1972 by E. C. Quesenberry, B. O. Van Hook, and C. C. Glover and assigned to the same assignee as the present invention.

BACKGROUND OF THE INVENTION

1. Field of the Invention

The present invention relates to radar system and, in particular, to a digital method and system for positioning a radar system antenna particularly of the type employing a driven beam steering reflector, e.g., a cassegrain antenna, wherein the reflector position is related to the radar beam position by a complex function.

2. State of the Prior Art

In a typical antenna drive servo system utilized in radar systems having angle tracking capabilities, the angular position of the line-of-sight to the target is ordinarily directly available from the angular position of the antenna or some mechanical element aligned with the radar beam. Other required quantities, such as the angular rate of the line-of-sight, may be obtained directly from the angular position of the antenna through the use of rate gyros slaved to the mechanical element aligned with the radar beam.

Cassegrain antenna systems typically employ a non-rotatable antenna and, in close association therewith, a reflecting element from which the radar beam is reflected toward the target. The typically lightweight reflecting element is driven in azimuth and elevation to change the radar beam position. Significant size and weight reductions in the antenna system are thus achieved.

However, in a cassegrain antenna system there is no mechanical element directly aligned with or movable in a one-to-one relationship with the radar beam. While the radar beam angular position is related to the deflection angle of the driven reflecting element relative to a set of predetermined axes, it has been found that this relationship may be extremely complex particularly in a system in which the reflector axes are gimbaled on a platform which is free to move relative to the line-of-sight to the target as is the situation in an airborne radar system. Since neither the reflector nor any other mechanical element of the system is directly aligned with the radar beam, the making of measurements of the target line-of-sight or beam position and angular rate by conventional techniques is impractical.

For example, rate gyros slaved to the reflector can provide indications of the angular rates of reflector movement in azimuth, elevation and roll. However, the resulting rate indications from the rate gyros are not equal to the angular rates of movement of the line-of-sight to the target.

Slaving rate gyros directly to the reflector requires additional rate gyros slaved to the movable platform, i.e., the aircraft, as well as complex signal processing in order to obtain the desired line-of-sight angular rates. If the rate gyros slaved to the aircraft are to be eliminated, an intricate mechanical model which takes into account the complex relationship between reflector position and beam position must be interposed between the reflector and each rate gyro. In addition, the use of rate gyros may significantly detract from the advantageous reduction in size and weight obtained through the use of the cassegrain antenna type system.

The use of digital techniques in the positioning of an antenna presents further problems particularly since calculations are performed at discrete time intervals rather than continuously as with an analog system. Moreover, loss of accuracy may occur in a digital system if resolution is not sufficiently high and time problems may be encountered where certain calculations such as square roots are frequently required.

OBJECTS AND SUMMARY OF THE INVENTION

It is accordingly an object of the present invention to provide a novel method and digital system for positioning and determining the position of a radar beam in a radar system employing a beam steering reflecting element such as a cassegrain antenna.

It is another object of the present invention to provide a novel method and digital system for tracking a target wherein the necessity for rate gyros is obviated in the angle tracking loop.

It is yet another object of the present invention to provide a novel method and radar tracking system wherein angular information including the sensed tracking error of the radar is referenced to a fixed coordinate system and rates are calculated by digital techniques from this information in lieu of using rate gyro data in the tracking loop.

It is yet a further object of the present invention to provide a novel method and digital system for generating radar antenna drive signals to track a target by digital techniques wherein time skewing of the digital data is eliminated and data is selected in such a way that highly accurate results are obtained.

It is still another object of the present invention to provide a novel method and digital normalizing system for normalizing the data employed in a digital radar target tracking system.

These and many other objects and advantages are accomplished in accordance with the present invention in a radar system employing an antenna mounted on a movable platform such as an aircraft through the use of entirely digital techniques. A sensed tracking error signal is transformed into a target line-of-sight direction error signal referenced to a fixed coordinate system such as an earth or any relatively inertial coordinate system. The target line-of-sight direction error signal in the fixed coordinate system is utilized to generate a target line-of-sight direction signal and the target line-of-sight direction signal is then utilized to generate angular error signals to drive the antenna at the proper rate and in the proper direction to track the target. The signals employed preferably all represent the direction cosines of vectors thereby facilitating the calculations and the eliminating poles in the operating region.

The system accounts for a rotational affect of a cassegrain antenna on the radar beam and also takes advantages of the relationship between the sensed tracking error signals and the direction cosines of the beam line-of-sight. Moreover, the system provides target line-of-sight angular rates where required for computing target rates for gun fire control systems and the like. Such rates are computed from the stabilized line-of-sight direction error vector, rate gyros are not required.

Time skewing of the system input data is eliminated by simultaneously sampling all input signals and performing all preliminary calculations prior to storing the data in an operating or main memory. Moreover, the input data is normalized in a very efficient manner through the use of a reference voltage which varies in amplitude in a manner related to variations in input data voltage variations. In addition, improved resolution and greater accuracy is obtained by making use of twice the values of certain angles rather than the angles themselves, particularly with regard to reflector position angles.

The above objects and advantages of the present invention will become apparent to one skilled in the art to which it pertains from the following detailed description read in conjunction with the attached drawings.

BRIEF DESCRIPTION OF THE DRAWINGS

FIG. 2a is a schematic representation of a portion of the system of FIG. 1;

FIGS. 2b–2d are graphs illustrating the relationships between beam and target lines-of-sight of the system of FIG. 1;

DETAILED DESCRIPTION

Figure 1:
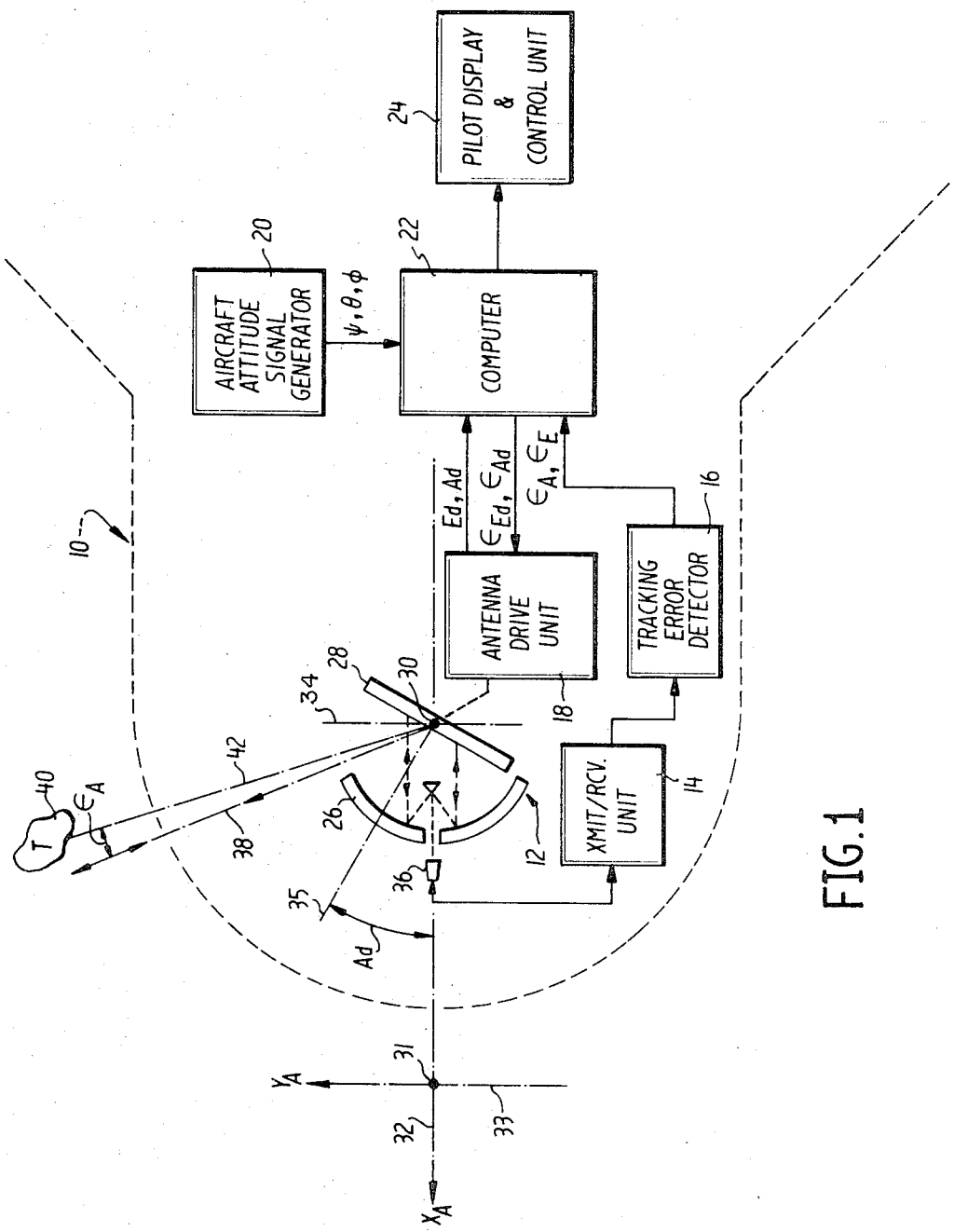
FIG. 1 is a functional block diagram of a radar system operable in accordance with the present invention.

A radar system operable in accordance with the present invention is illustrated in FIG. 1. Since the invention has particular utility in the environment of an airborne radar system, the illustrated embodiment is shown in FIG. 1 in this environment in the forward portion of an aircraft 10 and is described hereinafter in this connection. It should, however, be understood that the invention is not limited to this application.

Referring to FIG. 1, the system generally includes an antenna assembly 12, a suitable conventional transmitter/receiver unit 14, a suitable conventional tracking error detector 16, a suitable conventional antenna drive unit 18, a suitable conventional aircraft attitude signal generator 20, a computer 22, and a pilot display and control unit 24.

The antenna 12 is preferably a cassegrain type antenna and may include a sub-reflector 26 and a twist reflector 28. The twist reflector 28 may be gimbaled for movement in azimuth about a generally vertically disposed axis 30 orthagonal to the longitudinal axis 32 of the aircraft. Likewise, the twist reflector 28 may be gimbaled for rotational movement in elevation about a generally horizontally disposed gimbal axis 34 orthagonal to the aircraft axis 32.

To facilitate the description hereinafter, the aircraft may be assumed to have orthogonal axes of rotation in azimuth and elevation generally indicated respectively at 31 (projecting into the paper) and 33 normal thereto. The aircraft roll axis corresponds to the longitudinal axis 32 of the aircraft. A right-hand, three-space aircraft coordinate system having axes $X_A$ and $Y_A$ as illustrated in FIG. 1 and a third axis $Z_A$ (positive in a direction into the paper) may be set up to define the aircraft attitude relative to a selected right-hand, three-space fixed coordinate system such as an earth coordinate system having axes north ($X$), east ($Y$) and down ($Z$). Moreover, the position of the twist reflector 28 may be defined relative to the aircraft axes $X_A$, $Y_A$ and $Z_A$ from a right-hand, orthogonal reflector axis system $X_R$, $Y_R$ and $Z_R$.

For example, and as illustrated, the reflector 28 angular position in azimuth may be defined as the angle $Ad$ between a line 35 ($X_R$ axis) normal to the surface of the reflector 28 and the aircraft axis 32 ($X_A$) measured in the $X_A$-$Y_A$ plane. The reflector 28 angular position in elevation may be defined as the angle $Ed$ between the $X_R$ axis and the $X_A$-$Y_A$ plane measured in the $X_R$-$Z_A$ plane.

Likewise, the attitude of the aircraft in azimuth relative to a selected fixed coordinate system may be defined in any suitable conventional manner as, for example, the angle $\psi$ between the axis 32 ($X_A$) and the $X$ axis of the selected coordinate system, e.g., north in any earth system, measured in the $X$-$Y$ plane or north-east plane of the fixed coordinate system. The attitude of the aircraft in elevation relative to the fixed coordinate system may be defined in any suitable conventional manner as, for example, the angle $\theta$ between the aircraft axis 32 ($X_A$) and the $X$-$Y$ plane measured in the $X_A$-$Z$ plane. Finally, the aircraft roll angle relative to the fixed coordinate system may also be defined in any suitable conventional manner as, for example, the angle $\phi$ measured about the aircraft $X_A$ axis in the $Y$-$Z$ plane and between $Y_A$ axis and the $X$-$Y$ or north-east plane.

As used herein, the symbols representing angular quantities such as the symbols $Ad$ and $Ed$ representing reflector 28 angular azimuth and elevation positions are utilized to represent both the angular positions and the signals which represent these angular quantities. Thus, the angular quantities $Ad$ and $Ed$ represent reflector angles and also represent the electrical or mechanical signals by which these angles are represented for processing in the system.

With continued reference to FIG. 1, wave energy from the transmitter/receiver unit 14 may be directed to a feedhorn 36 disposed either behind the sub-reflector 26 as illustrated or behind the twist reflector 28. In either feedhorn arrangement, the wave energy from the feedhorn 36 strikes the sub-reflector 26 as horizontally polarized wave energy and, because of the reflective characteristics of the sub-reflector 26, is reflected toward the twist reflector 28. The horizontally polarized wave energy from the sub-reflector 26 strikes the twist reflector 28 and is reflected from the surface thereof as a vertically polarized conical beam having a central axis generally indicated at 38 in the drawing.

The vertically polarized conical beam freely passes through the sub-reflector 26 toward a target 40.

Assuming that a portion of the beam strikes the target 40, energy is reflected to the antenna 12 and is directed to the receiver portion in the transmitter/receiver unit 14. The tracking error detector 16 then utilizes the signal reflected from the target 40 to generate azimuth and elevation angle tracking errors $\epsilon_A$ and $\epsilon_E$, respectively. The quantities $\epsilon_A$ and $\epsilon_E$ represent the angular error between the centerline or the line-of-sight 38 of the transmitted beam and the line-of-sight 42 to the target 40.

The error signals $\epsilon_A$ and $\epsilon_E$ from the tracking error detector 16 may be applied to the computer 22 and there utilized, in conjunction with aircraft attitude information from the aircraft attitude signal generator 20 and reflector position information from the antenna drive unit 18, to generate reflector error signals $\epsilon_{Ad}$ and $\epsilon_{Ed}$. The error signals $\epsilon_{Ad}$ and $\epsilon_{Ed}$ may then be applied to the antenna drive unit 18 to position the twist reflector 28 in azimuth and elevation, respectively, such that the angular azimuth and elevation errors between the beam line-of-sight 38 and the target line-of-sight 42 are eliminated.

To facilitate an understanding of the invention, the generation of the error signals $\epsilon_A$ and $\epsilon_E$ by the tracking error detector 16 and the quantities which these signals represent are described hereinafter in connection with FIGS. 2a–2d.

The error signals $\epsilon_A$ and $\epsilon_E$ may be obtained in any suitable conventional manner such as through the use of a four quadrant detector as is shown in FIG. 2a. Referring now to FIG. 2a, the wave energy from the transmitter is transmitted outwardly along the beam line-of-sight 38 and returned along the target line-of-sight 42. Assuming that only an elevation error $\epsilon_E$ exists between the beam and the target lines-of-sight, the returned energy strikes the feedhorn 36, e.g., the illustrated four-quadrant detector, and the return energy detected in each quadrant A to D is summed to obtain elevation and azimuth tracking errors. For example, the aximuth tracking error may be provided in accordance with the following equation:

$$\epsilon_A = [(A + D) - (B + C)]/[A + B + C + D]$$

Likewise, the elevation error may be given by the following equation:

$$\epsilon_E = [(A + B) - (C + D)]/[A + B + C + D]$$

The actual detected tracking error signals $\epsilon_A$ and $\epsilon_E$ thus represent angular tracking errors. For example, as is illustrated in FIGS. 2b–2d, a right-hand, three-space line-of-sight coordinate system having orthogonal axes $X_L$, $Y_L$ and $Z_L$ may be established with the axis $X_L$ corresponding to the beam line-of-sight 38. In the situation in which the beam and target lines-of-sight coincide, there is no tracking error and the direction to the target may be represented by a unit vector $u$ (i.e., a vector $u$ of length one) coincident with the beam line-of-sight. This unit vector $u$ has components $u_X$, $u_Y$ and $u_Z$ which, with no tracking error, are given as direction cosines 1,0,0 (the 1 representing the length of the projection of the vector onto the $X_L$ axis, and the 0's representing the lengths of the projections of the vector onto the $Y_L$ and $Z_L$ axes, respectively).

If, on the other hand, the target line-of-sight 42 is displaced by an angle $\epsilon$ from the beam line-of-sight 38, the unit vector $u$ representing the line-of-sight to the target is displaced from the $X_L$ axis by the angle $\epsilon$. This angle $\epsilon$ has a component $\epsilon_A$ in the horizontal or azimuth plane defined by the axes $X_L$ and $Y_L$ (FIG. 2c and a component $\epsilon_E$ in the vertical or elevation plane defined by the axes $X_L$ and $Z_L$ (FIG. 2d). These components $\epsilon_A$ and $\epsilon_E$ represent the respective azimuth and elevation angular errors between the beam and target lines-of-sight and correspond to the signals $\epsilon_A$ and $\epsilon_E$ generated as tracking error signals.

It may be validly assumed that the azimuth and elevation error signals $\epsilon_A$ and $\epsilon_E$ in the respective azimuth and elevation planes are very small angular quantities when the system is placed in track mode. Thus, in both the azimuth and elevation line-of-sight planes as shown in FIGS. 2c and 2d, respectively, the projections of the unit vector u onto the $X$ axis is approximately equal to the unit vector length, i.e., approximately equal to 1. The projection of the unit vector $u$ onto the $Y$ axis is equal to (Sin $\epsilon_A$ cos $\epsilon_E$) which, for small angles, is approximately equal to $\epsilon_A$. Likewise, the projection of the elevation angle $\epsilon_E$ onto the $Z_L$ axis is approximately equal to the angle $-\epsilon_E$ for small angles (the minus sign accounting for the downward direction of the Z axis).

It can thus be seen that the respective azimuth and elevation angle tracking error signals $\epsilon_A$ and $\epsilon_E$ may be used to represent the deviation of a unit vector $u$ from a zero tracking error positions, i.e., to represent the direction cosine errors, with respect to the beam line-of-sight, of a unit vector pointing along the target line-of-sight. Of course, when the beam line of sight 38 is aligned with the line-of-sight 42 to the target, the unit vector may be represented by its projections along the line-of-sight axes $X_L$, $Y_L$ and $Z_L$ by the quantities 1, 0, 0 respectively.

In the event that the beam and target lines-of-sight are not aligned, the change in the $X_L$ projection in negligible in track mode so this change or deviation of the $X_L$ projection from the zero track error position is assumed to be zero. The deviations of the $Y_L$ and $Z_L$ projections (initially zero with no tracking error) are approximately equal to the angle tracking errors $\epsilon_A$ and $\epsilon_E$, respectively. Thus, these deviations along the axes $X_L$, $Y_L$ and $Z_L$ may be represented by the quantities 0, $\epsilon_A$ and $-\epsilon_E$, respectively.

As can be seen from FIG. 2a, the reflector axes $X_R$, $Y_R$ and $Z_R$ are not coincident with the beam line-of-sight axes $X_L$, $Y_L$ and $Z_L$. The respective reflector azimuth and elevation position angles $Ad$ and $Ed$ are thus not equal to the respective azimuth and elevation beam line-of-sight positions angles $\lambda_a$ and $\lambda_e$ measured with respect to the aircraft axes. It has been found that relationship between these angles may be expressed by the following equation:

$$\lambda_a = \tan^{-1}\left[\cos^2 Ed \sin(2Ad)\right]/\left[(2\cos^2 Ed)(\cos^2 Ad) - 1\right] \quad (1)$$

$$\lambda_e = \sin^{-1}[\cos Ad \sin(2Ed)] \quad (2)$$

Moreover, it has been found that the reflector 28 has a peculiar rotational affect on the beam when both the reflector azimuth and elevation angles $Ad$ and $Ed$ are unequal to zero. Thus, this rotational affect must be accounted for when transforming quantities from the beam line-of-sight axis system to the reflector, aircraft or fixed axis systems. This may be accomplished through the use of a derotation matrix $C$ expressed as follows:

$$C = \frac{1}{\cos \lambda A \cos \lambda e + 1} \begin{vmatrix} \cos \lambda a + \cos \lambda e & -\sin \lambda a \sin \lambda e \\ \sin \lambda a \sin \lambda e & \cos \lambda a + \cos \lambda e \end{vmatrix} \quad (3)$$

As will hereinafter become apparent, the transformation of an angular quantity from the beam line-of-sight axes system to the aircraft axes system requires a transformation which takes into account both the angular relationships of equations (1) and (2) and the derotation affect of equation (3). When these affects are combined into one transform, hereinfter referred to as the $T$ transform, the only angular quantities required are the angles to be transformed and the reflector position angles $Ad$ and $Ed$. Thus the target line-of-sight direction cosine errors $\epsilon_A$ and $\epsilon_E$ previously discussed may be transformed into direction cosine errors $T_X$, $T_Y$ and $T_Z$ referenced to the aircraft axes as follows:

$$\begin{bmatrix} T_X \\ T_Y \\ T_Z \end{bmatrix} = [T] \begin{bmatrix} 0 \\ \epsilon_A \\ \epsilon_E \end{bmatrix} \quad (4)$$

where:

$$[T] = \begin{bmatrix} (2\cos^2 A_d \cos^2 E_d - 1) - (\cos^2 E_d \sin 2A_d)(\cos A_d \sin 2E_d) \\ (\cos^2 E_d \sin 2A_d) - (2 \cos^2 E_d \sin^2 A_d - 1)(\sin A_d \sin 2E_d) \\ (-\cos A_d \sin 2E_d)(\sin A_d \sin 2E_d)(\cos 2E_d) \end{bmatrix}$$

(5)

Figure 3:
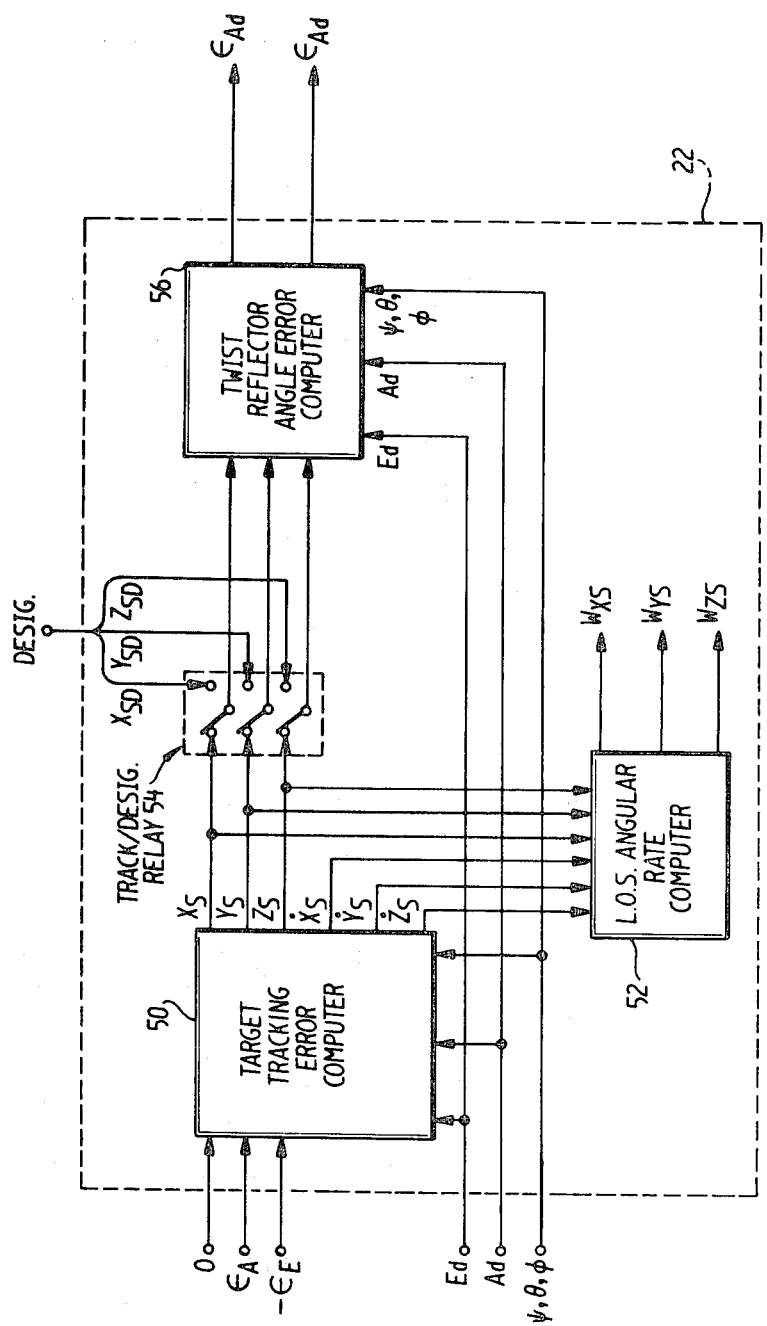
FIG. 3 is a functional block diagram of the computer of FIG. 1.

With the foregoing in mind and with reference now to FIG. 3 wherein the computer 22 of FIG. 1 is illustrated in greater detail, the tracking error direction cosine signals 0, $\epsilon_A$ and $-\epsilon_E$ representing deviations of a unit vector from the beam line-of-sight axes $X_L$, $Y_L$ and $Z_L$, respectively, are applied to a target tracking error computer 50. The signals $Ed$ and $Ad$ representing the angular elevation and azimuth positions of the twist reflector 28 are supplied to the target tracking error computer 50 from the antenna drive unit 18 of FIG. 1 and the signal $\psi$, $\theta$, and $\phi$ representing aircraft attitude relative to a fixed coordinate system are supplied to the tracking error computer 50 from the aircraft attitude signal generator 20 of FIG. 1.

The calculated target line-of-sight direction cosines $X_S$, $Y_S$ and $Z_S$ relative to the selected fixed coordinate system, e.g., the earth coordinate system, may be applied from the target tracking error computer 50 to a line-of-sight angular rate computer 52. The target line-of-sight direction cosine rates $\dot{X}_S$, $\dot{Y}_S$ and $\dot{Z}_S$ may also be applied to the line-of-sight angular rate computer 52. The angular rate computer 52 may provide line-of-sight angular rate signals $w_{XS}$, $w_{YS}$ and $w_{ZS}$ which may be utilized, in conjunction with target range, for example, to compute target lead angles and the like when the tracking system of the present invention is utilized in connection with a system such as a gun fire control system wherein these values are required.

The line-of-sight direction cosines $X_S$, $Y_S$ and $Z_S$ in the fixed coordinate system may also be applied through a suitable track/designate selector such as the relay generally indicated at 54. The designate or DESIG signal from the pilot display and control unit 24 of FIG. 1 may also be applied to the relay 54 and the signal selected by the relay 54 may be applied to a twist reflector angle error computer 56. The reflector elevation and azimuth position signals $Ed$ and $Ad$ may also be applied to the twist reflector angle error computer 56 together with the aircraft attitude signals $\psi$, $\theta$ and $\phi$. The twist reflector angle error computer may provide the output signals $\epsilon_{Ad}$ and $\epsilon_{Ed}$ to the antenna drive servo 18 of FIG. 1.

In operation, the line-of-sight direction cosine error signals 0, $\epsilon_A$ and $-\epsilon_E$ are transformed, as is hereinafter described, into direction cosine error signals $\Delta X_S$, $\Delta Y_S$ and $\Delta Z_S$ referenced to the selected fixed coordinate system. These signals transformed into the fixed coordinate system are then utilized, in conjunction with initial line-of-sight direction cosine signals hereinafter described in greater detail in connection with FIG. 4, to generate the target line-of-sight direction cosine signals $X_S$, $Y_S$ and $Z_S$ relative to the fixed coordinate system. In addition, target line-of-sight direction cosine rate signals $\dot{X}_S$, $\dot{Y}_S$ and $\dot{Z}_S$ are generated by the tracking error computer 50 and may be utilized, together with the line-of-sight direction cosines $X_S$, $Y_S$ and $Z_S$, to compute line-of-sight angular rates as is hereinafter described.

With the system in track mode as illustrated, the relay 54 applies the fixed coordinate system referenced target line-of-sight direction cosine signals $X_S$, $Y_S$ and $Z_S$ to the twist reflector angle error computer 56. With the system in designate mode, the fixed coordinate referenced DESIG direction cosine signals $X_{SD}$, $Y_{SD}$ and $Z_{SD}$ may be applied to the reflector angle error computer 56. The twist reflector angle error computer 56 then transforms these direction cosine values into angular twist reflector pointing error signals $\epsilon_{Ad}$ and $\epsilon_{Ed}$ which are utilized to drive the twist reflector 28 of FIG. 1 through the antenna drive unit 18 in any suitable conventional manner.

The line-of-sight angular rate computer 52 calculates the line-of-sight angular rates $w_{XS}$, $w_{YS}$ and $w_{ZS}$ in the fixed coordinate system in accordance with the following equations:

$$w_{XS} = [Y_S \dot{Z}_S - Z_S \dot{Y}_S]/[X_S^2 + Y_S^2 + Z_S^2]$$

(6)

$$w_{YS} = [Z_S \dot{X}_S - X_S \dot{Z}_S]/[X_S^2 + Y_S^2 + Z_S^2]$$

(7)

$$w_{ZS} = [X_S \dot{Y}_S - Y_S \dot{X}_S]/[X_S^2 + Y_S^2 + Z_S^2]$$

(8)

These calculations may be performed in any suitable conventional manner as, for example, through the use of analog or digital multipliers, adders, subtractors, and dividers. Moreover, the values $X_S$, $Y_S$ and $Z_S$ may be provided in a suitable form to a general purpose or special purpose digital computer programmed to solve the above equations (6), (7) and (8).

Figure 4:
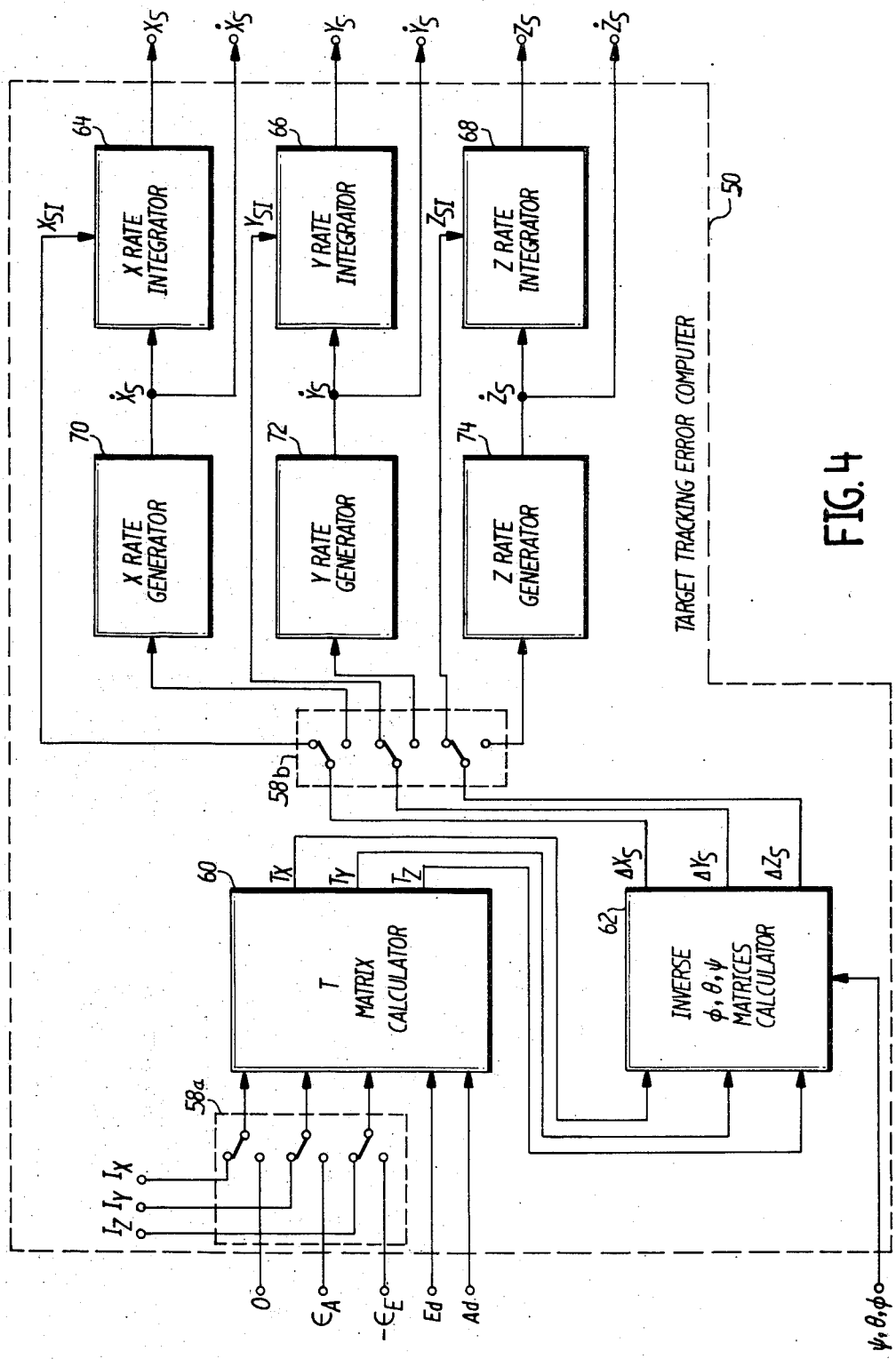
FIG. 4 is a more detailed functional block diagram of the target tracking error computer of FIG. 3.

The target tracking error computer 50 of FIG. 3 is illustrated in greater detail in FIG. 4. Referring now to FIG. 4, the tracking error direction cosine signals 0, $\epsilon\epsilon_A$ and $-\epsilon_E$ representing the deviations of the unit vector from the line-of-sight axes $X_L$, $Y_L$ and $Z_L$, respectively, may be applied to an initialize/track signal selector 58a such as the illustrated relay contacts. The initial values $I_X$, $I_Y$ and $I_Z$ of the projections of the unit vector along the respective $X_L$, $Y_L$ and $Z_L$ beam line-of-sight axes, i.e., the quantities 1, 0, 0, respectively, may also be applied to the selector 58 and the signals selected by the selector 58a may be applied to a T matrix calculator 60.

The T matrix calculator 60 may be also be supplied with the twist reflector 28 azimuth and elevation position angles $A_d$ and $E_d$, respectively, referenced to the reflector gimbal axes. These reflector position angles $A_d$ and $E_d$ may be utilized, in conjunction with the direction cosine signals selected by the selector 58a to generate either initializing direction cosines $T_{XI}$, $T_{YI}$ and $T_{ZI}$ or direction cosine errors $T_X$, $T_Y$ and $T_Z$ in accordance with the following equations:

$$\begin{bmatrix} T_{XI} \\ T_{YI} \\ T_{ZI} \end{bmatrix} = [T] \begin{bmatrix} I_X \\ I_Y \\ I_Z \end{bmatrix} \quad (9)$$

$$\begin{bmatrix} T_X \\ T_Y \\ T_Z \end{bmatrix} = [T] \begin{bmatrix} 0 \\ \epsilon_A \\ -\epsilon_E \end{bmatrix} \quad (10)$$

where [[T] is given by equation (5).

Of course, the T matrix calculator may solve the above equations in any suitable conventional manner. For example, a matrix in the form of equation (9) and as used hereinafter may be expanded to obtain the components as follows:

$$\begin{bmatrix} T_{XI} \\ T_{YI} \\ T_{ZI} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} I_X \\ I_Y \\ I_Z \end{bmatrix} \quad (11)$$

$$T_{XI} = a_{11}I_X + a_{12}I_Y + a_{13}I_Z \quad (12)$$

$$T_{YI} = a_{21}I_X + a_{22}I_Y + a_{23}I_Z \quad (13)$$

$$T_{ZI} = a_{31}I_X + a_{32}I_Y + a_{33}I_Z \quad (14)$$

It is thus apparent that through the use of conventional analog or digital multipliers and adders, the desired output quantities in the form of signals may be obtained from the input quantities in the form of signal utilizing the given $a_{11}$–$a_{33}$ quantities.

The generated $T_X$, $T_Y$ and $T_Z$ signals (or the $T_{XI}$, $T_{YI}$, $T_{ZI}$ signals in initialization mode) from the T matrix calculator 60 may be applied to an inverse $\phi$, $\theta$, $\psi$ matrices calculator 62 together with the aircraft attitude signals $\phi$, $\theta$ and $\psi$. The inverse $\phi$, $\theta$, $\psi$ matrices calculator 62 utilizes these input signals to generate the line-of-sight direction cosine error signals $\Delta X_S$, $\Delta Y_S$ and $\Delta Z_S$ in track mode or the stabilized initial direction cosine signals $X_{SI}$, $Y_{SI}$ and $Z_{SI}$ in initialization mode. The output signals $\Delta X_S$, $\Delta Y_S$ and $\Delta Z_S$ and the signals $X_{SI}$, $Y_{SI}$ and $Z_{SI}$ may be generated by the inverse matrices calculator in accordance with the following equations:

$$\begin{bmatrix} \Delta X_S \\ \Delta Y_S \\ \Delta Z_S \end{bmatrix} = [\psi]^{-1}[\theta]^{-1}[\phi]^{-1} \begin{bmatrix} T_X \\ T_Y \\ T_Z \end{bmatrix} \quad (15)$$

$$\begin{bmatrix} X_{SI} \\ Y_{SI} \\ Z_{SI} \end{bmatrix} = [\psi]^{-1}[\theta]^{-1}[\phi]^{-1} \begin{bmatrix} T_{XI} \\ T_{YI} \\ T_{ZI} \end{bmatrix} \quad (16)$$

where the matrices $[\psi]$, $[\theta]$ and $[\phi]$ are given by:

$$[\psi] = \begin{bmatrix} \cos\psi & \sin\psi & 0 \\ -\sin\psi & \cos\psi & 0 \\ 0 & 0 & 1 \end{bmatrix} \quad (17)$$

$$[\theta] = \begin{bmatrix} \cos\theta & 0 & -\sin\theta \\ 0 & 1 & 0 \\ \sin\theta & 0 & \cos\theta \end{bmatrix} \quad (18)$$

$$[\phi] = \begin{bmatrix} 1 & 0 & 0 \\ 0 & \cos\theta & \sin\theta \\ 0 & -\sin\theta & \cos\theta \end{bmatrix} \quad (19)$$

and the inverse of any of the above matrices is obtained by interchanging the rows and columns. For example, the inverse matrix $[\theta]^{-1}$ is given by:

$$[\theta]^{-1} = \begin{bmatrix} \cos\theta & 0 & \sin\theta \\ 0 & 1 & 0 \\ -\sin\theta & 0 & \cos\theta \end{bmatrix} \quad (20)$$

The initialization/track selector 58b, illustrated in FIG. 4 in initialization mode, supplies the initialization signals $X_{SI}$, $Y_{SI}$ and $Z_{SI}$ to the respective X rate, Y rate and Z rate integrators 64, 66 and 68, respectively. In track mode, the selector 58b supplies the $\Delta X_S$, $\Delta Y_S$ and $\Delta Z_S$ signals to the X rate, Y rate and Z rate generators 70, 72 and 74, respectively. The output signals from the X, Y and Z rate generators 70–74, i.e., the line-of-sight direction cosine rates $X_S$, $Y_S$ and $Z_S$, are applied to the respective X, Y, and Z rate integrators 64–68 and are also provided as output signals from the target tracking error computer 50. The target line-of-sight direction cosine signals $X_S$, $Y_S$ and $Z_S$ from the X, Y, and Z rate integrators 64–68, respectively, are also provided as output signals from the target tracking error computer 50.

In operation, the target tracking error computer is first placed in initialization mode and the selector switches 58a assume the illustrated positions. The initial line-of-sight direction cosine values of $I_X$, $I_Y$ and $I_Z$ (the quantities 1, 0, 0 assuming no tracking errors as was previously described in connection with FIG. 2) are transformed into aircraft axes related values by the T matrix calculator 60. These initialization values are then transformed by the inverse matrices calculator 62 into initial line-of-sight direction cosines $X_{SI}$, $Y_{SI}$ and $Z_{SI}$ referenced to the selected fixed coordinate system and are then applied to the $X$, $Y$, and $Z$ rate integrators to establish the initial values or constants of integration of these integrators.

After the system has been initialized and the initial conditions of the $X$, $Y$, and $Z$ rate integrators 64–68 have been set, the selector 58a selects the target line-of-sight direction cosine error signals 0, $\epsilon_A$ and $-\epsilon_E$ for application to the $T$ matrix calculator 60. Moreover, the selector 58a applies the output signals from the inverse matrices calculator 62 to the $X$, $Y$ and $Z$ rate generators 70–74.

The target line-of-sight error direction cosine signals 0, $\epsilon_A$ and $-\epsilon_E$ in the line-of-sight coordinate system previously described are transformed into the values $T_X$, $T_Y$ and $T_Z$, respectively, referenced to the aircraft axes system. The aircraft axes referenced values $T_X$, $T_Y$ and $T_Z$ are then referenced to the selected fixed coordinate system by the inverse matrices calculator 62. The resulting line-of-sight direction cosine error signals $\Delta X_S$, $\Delta Y_S$ and $\Delta Z_S$ are thus "stabilized" or referenced to the selected fixed coordinate system.

The "stabilized" line-of-sight direction cosine error signals $\Delta X_S$, $\Delta Y_S$ and $\Delta Z_S$ are applied to the $X$, $Y$ and $Z$ rate generators 70–74, respectively, resulting in the "stabilized" line-of-sight direction cosine error rates $\dot{X}_S$, $\dot{Y}_S$ and $\dot{Z}_S$. The generation of the error rates $\dot{X}_S$, $\dot{Y}_S$ and $\dot{Z}_S$ is accomplished by modifying each of the error signals $\Delta X_S$, $\Delta Y_S$ and $\Delta Z_S$ in accordance with a rate memory transfer function $R$ and this modification may be expressed in terms of the La Place operator $S$ as follows:

$$\dot{X}_S(S) = [R(S)] [\Delta X_S(S)] \quad (21)$$

$$\dot{Y}_S(S) = [R(S)] [\Delta Y_S(S)] \quad (22)$$

$$\dot{Z}_S(S) = [R(S)] [\Delta Z_S(S)] \quad (23)$$

where:

$$R(S) = [Ka(S/\tau_1 + 1)]/[S(S/\tau_2 + 1)] \quad (24)$$

where:

$Ka$ is a transfer constant and $\tau_1$ and $\tau_2$ are circuit time constants which modify the frequency response of the tracking system.

These error rates are integrated by the $X$, $Y$ and $Z$ rate integrators 64–68, respectively, to provide the respective "stabilized" line-of-sight direction cosine signals $X_S$, $Y_S$ and $Z_S$. The transfer function of each of the integrators 64, 66 and 68 may be expressed as a function of the La Place operator $S$ as $1/S$. The initial conditions, when the $1/S$ transfer function is expressed as a function of time, are supplied as was previously described by the $X_{SI}$, $Y_{SI}$ and $Z_{SI}$ signals. The signals $X_S$, $Y_S$ and $Z_S$ thus define, in the fixed coordinate system, the orientation of a unit vector directed along the line-of-sight to the target, i.e., the signals $X_S$, $Y_S$ and $Z_S$ define the stabilized line-of-sight to the target in direction cosines.

Figure 5:
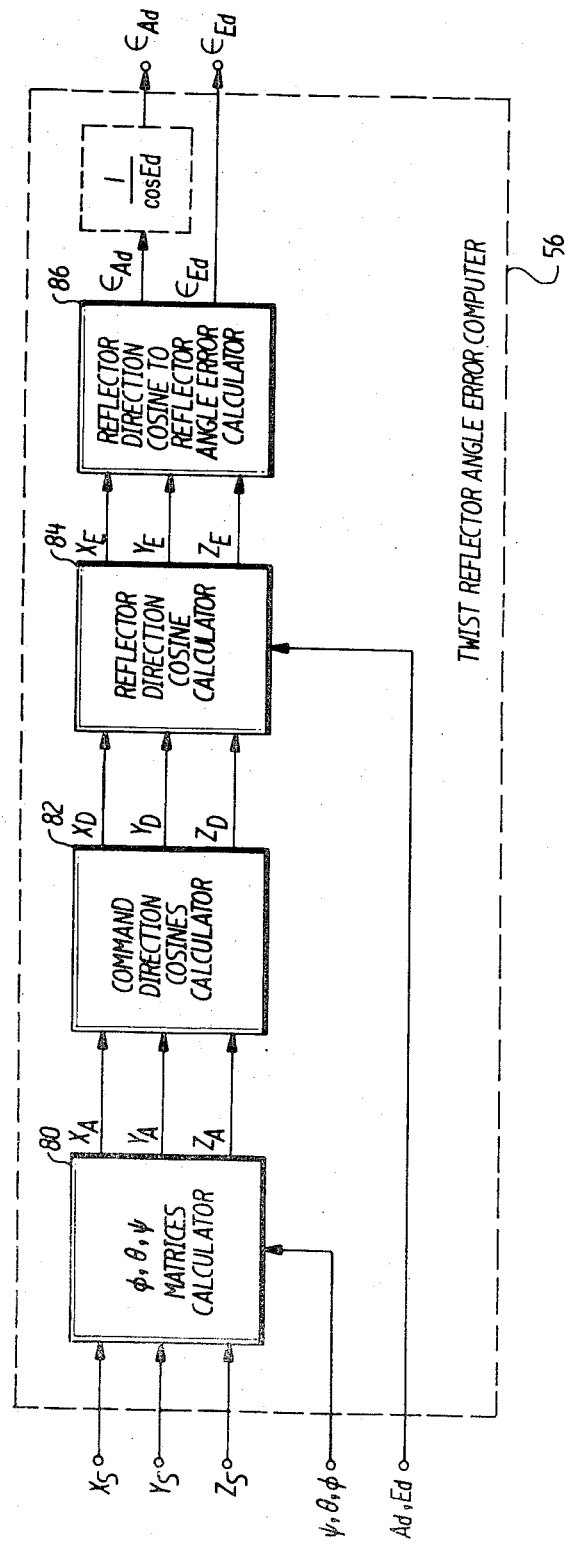
FIG. 5 is a more detailed functional block diagram of the twist reflector angle error computer of FIG. 3.

The twist reflector angle error computer 56 of FIG. 3 is illustrated in greater detail in FIG. 5. Referring now to FIG. 5, the "stabilized" direction cosine signals selected by the track/designator relay 54 of FIG. 3 are applied to a $\phi$, $\theta$, $\psi$ matrices calculator 80 in the twist reflector angle error computer 56. In track mode, these signals apply to the matrices calculator 80 comprise the line-of-sight direction cosine signals $X_S$, $Y_S$ and $Z_S$ generated by the target tracking error computer 50 of FIG. 3. In designate mode, the signals applied to the matrices calculator 80 may comprise the signals $X_{SD}$, $Y_{SD}$ and $Z_{SD}$ which may represent a search pattern or a particular set of "stabilized" line-of-sight direction cosine signals designating a particular target location.

The aircraft angular attitude signals $\psi$, $\theta$ and $\phi$ from the aircraft attitude signal generator 20 of FIG. 1 may also be applied to the matrices calculator 80 and the output signals $X_A$, $Y_A$ and $Z_A$ from the matrices calculator may be applied to a reflector commanded direction cosine calculator 82. The reflector commanded direction cosine calculator 82 generates commanded direction cosine signals $X_D$, $Y_D$ and $Z_D$ referenced to the aircraft axes and these signals may be applied to a reflector direction cosine calculator 84 together with the reflector angular position signals $Ad$ and $Ed$ from the reflector drive unit 18 of FIG. 1.

The reflector direction cosine calculator 84 transforms the commanded reflector direction cosines $X_D$, $Y_D$ and $Z_D$ into reflector direction cosines $X_E$, $Y_E$ and $Z_E$ referenced to the reflector axes. The reflector direction cosine signals $X_E$, $Y_E$ and $Z_E$ are then applied to a reflector direction cosine to reflector angle error calculator 86 and there transformed into reflector angle error signals $\epsilon_{Ad}$ and $\epsilon_{Ed}$. The signals $\epsilon_{Ad}$ and $\epsilon_{Ed}$ may be provided as output signals of the twist reflector angle error computer 56 for use by the antenna drive unit 18 of FIG. 1 in positioning the reflector 28. Moreover, to account for the effect of large elevation angles on the azimuth servo loop, the reflector azimuth angle error $\epsilon_{Ad}$ may be divided by the cosine of the reflector elevation angle $Ed$ as is illustrated in phantom. Thus, the overall azimuth loop gain remains essentially constant irrespective of elevation angle.

In operation, the tracking or designation "stabilized" line-of-sight direction cosine signals $X_S$, $Y_S$ and $Z_S$ applied to the matrices calculator 80 are transformed into line-of-sight direction cosines $X_A$, $Y_A$ and $Z_A$ referenced to the aircraft axes. This transformation may be accomplished in any suitable conventional manner, as was previously described, utilizing the $\psi$, $\theta$ and $\phi$ matrices of equations (17), (18) and (19). This transformation may be expressed as follows:

$$\begin{bmatrix} X_A \\ Y_A \\ Z_A \end{bmatrix} = [\phi][\theta][\psi] \begin{bmatrix} X_S \\ Y_S \\ Z_S \end{bmatrix} \quad (25)$$

The aircraft axes referenced direction cosines $X_A$, $Y_A$ and $Z_A$ may then be utilized to generate the direction cosine signals $X_D$, $Y_D$ and $Z_D$ in the reflector commanded direction cosine calculator 82 through the use of the following equations:

$$X_D = \frac{(1 + Xa)/2}{\sqrt{(1+X_a)/2}} \quad (26)$$

$$Y_D = Ya/2X_D \quad (27)$$

$$Z_D = Za/2X_D \quad (28)$$

The commanded reflector direction cosines $X_D$, $Y_D$ and $Z_D$ referenced to the aircraft axes must then be transformed into reflector direction cosines $X_E$, $Y_E$ and $Z_E$ referenced to the reflector axes. This may be accomplished in the reflector direction cosine calculator 84 in accordance with the following transform equations:

$$\begin{bmatrix} X_E \\ Y_E \\ Z_E \end{bmatrix} = [Ed][Ad] \begin{bmatrix} X_D \\ Y_D \\ Z_D \end{bmatrix} \quad (29)$$

where:

$$[Ad] = \begin{bmatrix} \cos Ad & \sin Ad & 0 \\ -\sin Ad & \cos Ad & 0 \\ 0 & 0 & 1 \end{bmatrix} \quad (30)$$

$$[Ed] = \begin{bmatrix} \cos Ed & 0 & -\sin Ed \\ 0 & 1 & 0 \\ \sin Ed & 0 & \cos Ed \end{bmatrix} \quad (31)$$

Having obtained the direction cosines of the reflector referenced to the reflector axes, angular reflector position error signals $\epsilon_{Ad}$ and $\epsilon_{Ed}$ in azimuth and elevation, respectively, may be generated by the reflector direction cosine to reflector angle error calculator 86. The direction cosine signals $X_E$, $Y_E$ and $Z_E$ will, of course, be equal to 1, 0, 0 if the commanded reflector position is the same as the present reflector position as indicated by the reflector direction cosine calculator 84. All other relationships between the present reflector position and the commanded reflector position show up in azimuth and elevation as values of $Y_E$ and $Z_E$ other than zero. Thus, the azimuth pointing error of the reflector is approximately equal to the value of $Y_E$ for small error angles. Likewise, the reflector elevation pointing error signal $\epsilon_{Ed}$ is approximately equal to the value $-Z_E$ for small pointing errors. A more exact mathematical relationship between $X_E$, $Y_E$, $Z_E$ and $\epsilon_{Ad}$, $\epsilon_{Ed}$ exists, however, and may be utilized in the reflector direction cosine to reflector angle error calculator 88 to provide the error signals $\epsilon_{Ad}$ and $\epsilon_{Ed}$. These relationships are:

$$\epsilon_{Ad} = \tan^{-1}(Y_E/X_E) \approx Y_E \quad (32)$$

$$\epsilon_{Ed} = \sin^{-1}[-Z_E/\sqrt{X_E^2 + Y_E^2 + Z_E^2}] \approx -Z_E \quad (33)$$

A preferred digital embodiment of the present invention is illustrated in the functional block diagrams of FIGS. 6-11.

Figure 6:
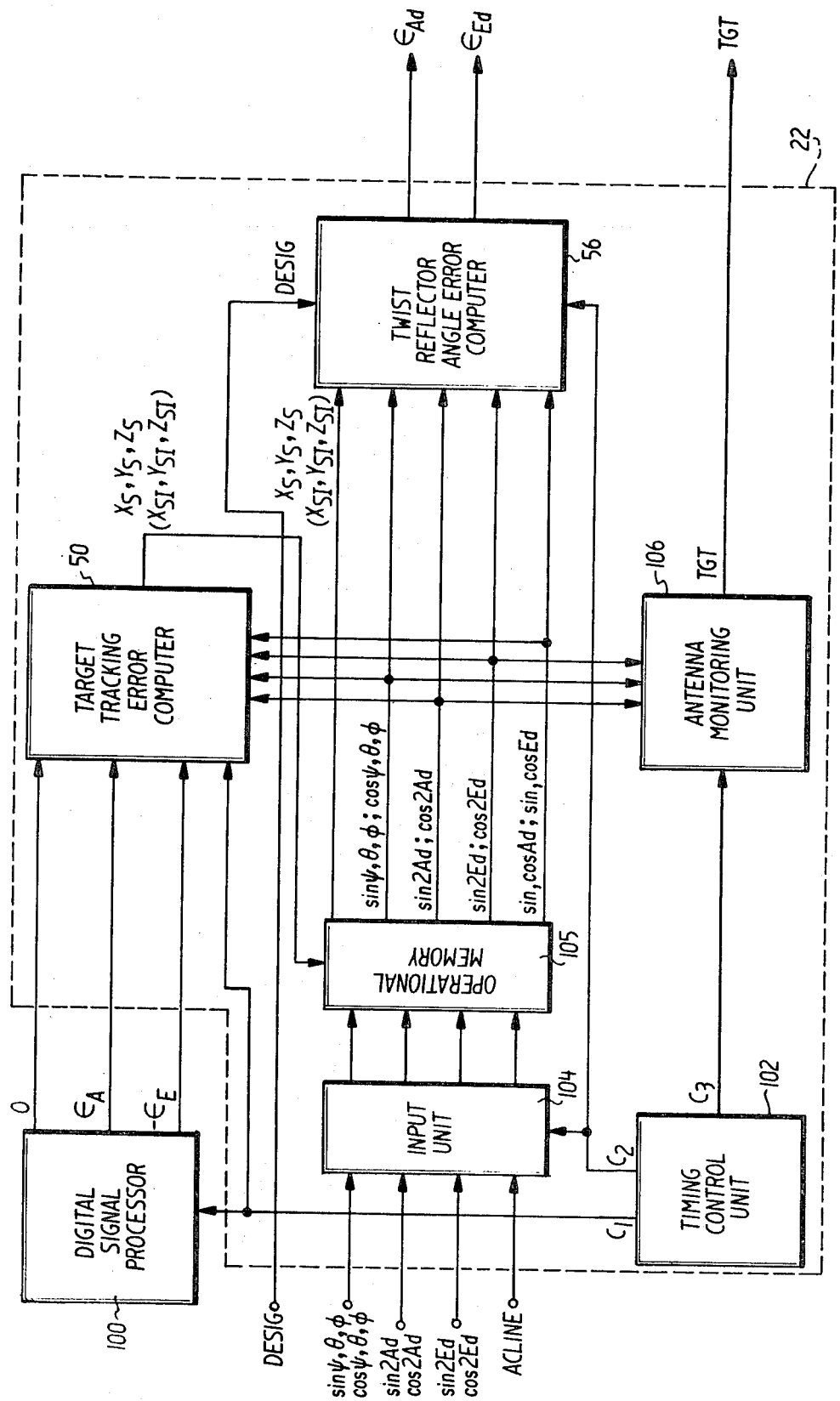
FIG. 6 is a functional block diagram of the preferred embodiment of the system of the present invention.

In the preferred embodiment of the invention, the various angular quantities from the aircraft attitude signal generator 20 and from the antenna drive unit 18 are preferably provided from suitable conventional resolvers as analog signals representing the sines and cosines of the angular quantities. Thus, the sines and cosines of the aircraft attitude angles $\psi$, $\theta$, and $\phi$ are supplied to the computer 22 as is illustrated in FIG. 6. Moreover, the resolvers providing the reflector angular quantities $Ad$ and $Ed$ are preferably driven, through suitable mechanical means, through twice the azimuth and elevation angles, respectively, of the reflector 28 of FIG. 1. The sines and cosines of twice the reflector azimuth and elevation angles $Ad$ and $Ed$ are thus provided to the computer 22 as is shown in FIG. 6.

The direction cosines 0, $\epsilon_A$ and $-\epsilon_E$ of the tracking error signal may be provided from a suitable conventional digital signal processor 100 either synchronously in response to a clock signal $C_1$ from a timing control unit 102 in the computer 22 or synchronously whenever the tracking error signal is generated by the digital signal processor. Intermediate buffers may be provided for asynchronous operation. In addition, the alternating current line voltage ACLINE supplied to the various angle resolvers may be provided to the computer 22. The DESIG signal may be supplied to the computer 22 from the pilot display and control unit 24 as was previously described.

The signals $\sin\psi$, $\cos\psi$, $\sin\theta$, $\cos\theta$, $\sin\phi$ and $\cos\phi$ from the aircraft attitude resolvers may be applied to an input unit 104 of the computer 22 together with the ACLINE signal and the reflector position signals $\sin 2Ad$, $\cos 2Ad$, $\sin 2Ed$ and $\cos 2Ed$. A clock signal $C_2$, preferably a 249 Hertz clock signal, from the timing control unit 102 is applied to the input unit 104 and to the twist reflector angle error computer 56 previously described in connection with FIGS. 3 and 5.

The input unit 104 may supply the aircraft attitude signals sin and $\cos\psi$, $\theta$ and $\phi$ as well as the twist reflector position signals sin and cos $2Ad$ and sin and cos $2Ad$ and sin and cos $2Ed$ in digital form to an operational memory 105 for storage of these signals until needed by the various computers. Upon demand, these stored signals may be supplied to the twist reflector angle error computer 56, an antenna monitoring unit 106 and to the target tracking error computer 50 previously described in connection with FIGS. 3 and 4.

The direction cosines 0, $\epsilon_A$ and $-\epsilon_E$ of the tracking error signals from the digital signal processor 100 are supplied to the tracking error computer 50 and the line-of-sight direction cosine signals $X_S$, $Y_S$ and $Z_S$ referenced to the fixed coordinate system are supplied from the target tracking error computer 50 to operational memory 105 for subsequent use by the twist reflector angle error computer 56 as is illustrated. The twist reflector angle error computer 56 provides the twist reflector error signals $\epsilon_{Ad}$ and $\epsilon_{Ed}$ as was previously described and the antenna monitoring unit 106 may provide target information signals TGT to the pilot display and control unit 24 of FIG. 1.

The timing control unit 102 may supply a clock signal $C_1$, preferably a 166 Hz. clock signal, to the digital signal processor 100 and to the target tracking error computer 50. The timing control unit 102 may also supply a clock signal $C_3$, preferably an 83Hz. clock signal, to the antenna monitoring unit 106. It can be seen that the clock signals $C_2$, $C_1$ and $C_3$ are thus synchronized in the respective ratios of 3:2:1.

In operation, the angle input signals and the AC line voltage are applied to the input unit 104 in an analog form. The input unit 104 samples all of these signals simultaneously at the rate of the $C_2$ clock signal, quantizes and normalizes these analog signals and stores the normalized signals in digital form in the operational memory 105 as is hereinafter described in greater detail in connection with FIG. 11.

The digital signal processor 100 supplies the tracking error signals in the form of digital direction cosines in any suitable conventional manner and the target tracking error computer 50 samples this data at the rate of the $C_1$ clock signal, e.g., 167 Hz.

Figure 7A:
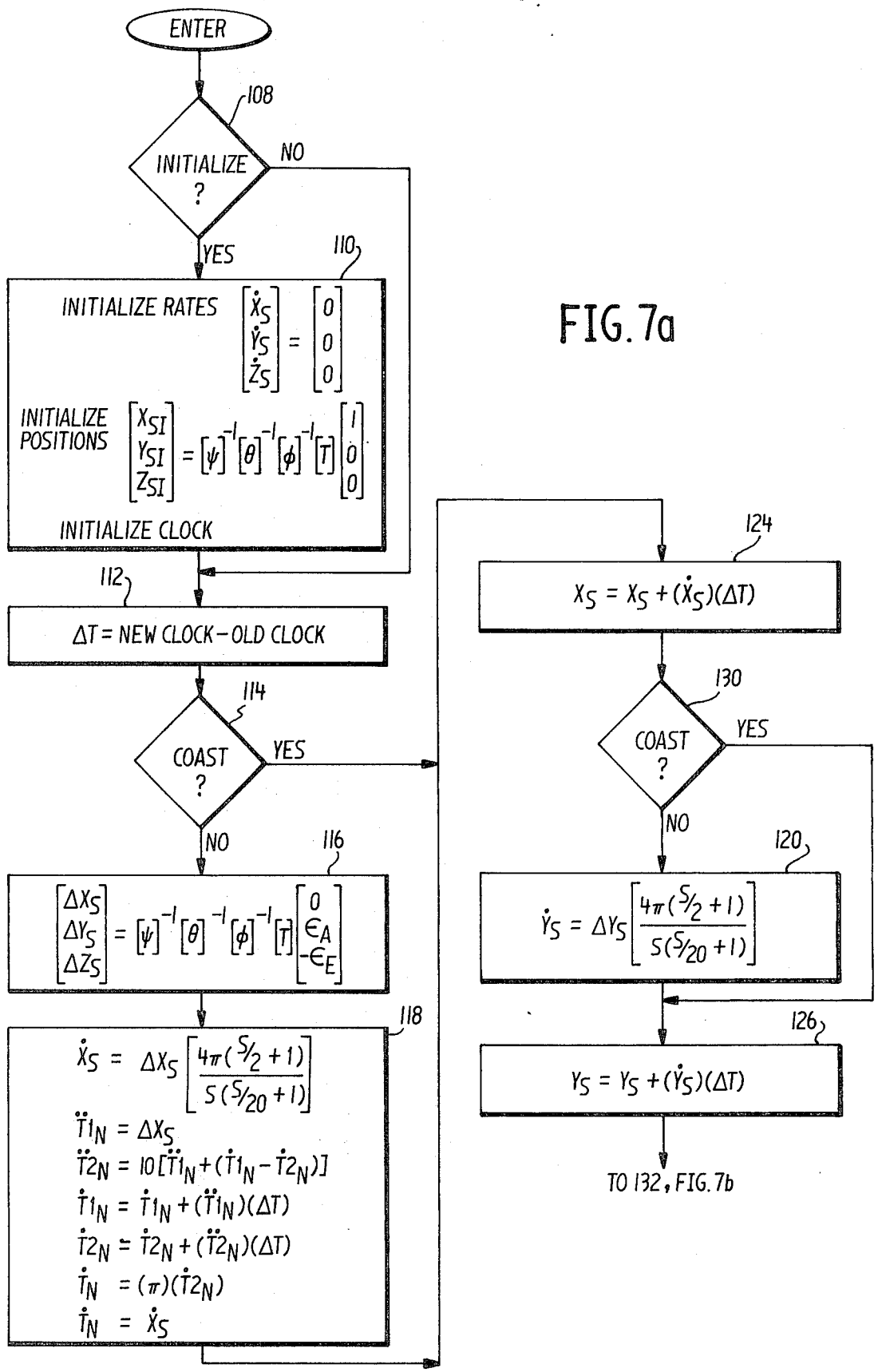
FIGS. 7a, 7b, 8 and 9 are flow diagrams illustrating the operation of the respective target tracking error computer, twist reflector angle error computer and antenna monitoring unit of FIG. 6.
Figure 7B:
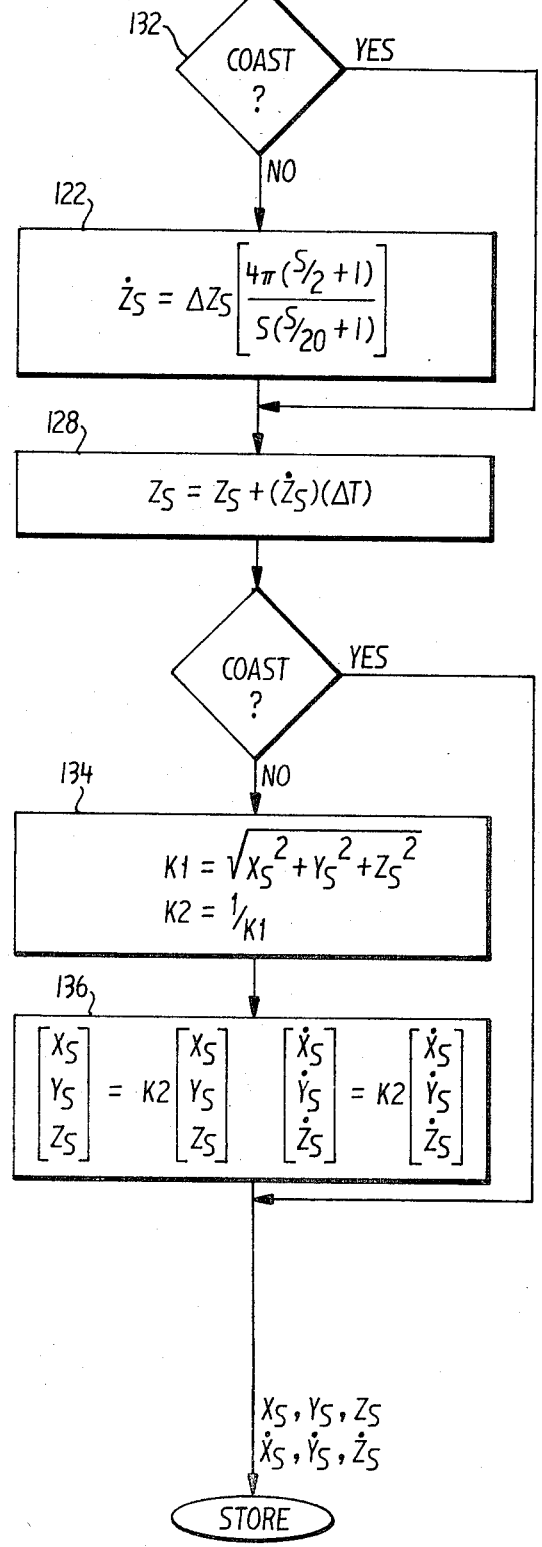

Referring now to FIGS. 7a and 7b wherein a flow diagram of the target tracking error computer 50 is provided to facilitate an understanding of the operation thereof, various quantities are initialized as is indicated at 108 and 110 when the system is first placed into track mode. For example, the line-of-sight error rates $\dot{X}_S$, $\dot{Y}_S$ and $\dot{Z}_S$ are set equal to zero and the initialization signals $X_{SI}$, $Y_{SI}$ and $Z_{SI}$ are calculated in the fixed coordinate system utilizing a zero error signal 1, 0, 0 as was previously described in connection with FIG. 4. Moreover, the clock signal is initialized on the first pass through the digital system.

After the first initialization pass, a time period $\Delta T$ between clock signals is established and a determination is made as to whether or not the system is in coast as indicated at 112 and 114, respectively. Assuming that the system is not in coast as might occur when the target is momentarily lost, the stabilized error signals $\Delta X_S$, $\Delta Y_S$ and $\Delta Z_S$ are calculated in accordance with equations 10 and 15 as is indicated at 116 in FIG. 7a.

The line-of-sight direction cosine error signals $\Delta X_S$, $\Delta Y_S$ and $\Delta Z_S$ are then utilized to calculate the line-of-sight error rates $\dot{X}_S$, $\dot{Y}_S$ and $\dot{Z}_S$ as is indicated, respectively, at 118, 120 and 122. As is indicated at 118, each of these error rates may be calculated as functions of time utilizing the time interval $\Delta T$ previously mentioned and the indicated double precision filter equations, e.g., 31 bit data words in contrast to 15 bit words for single precision. Double precision filter equations may then be utilized to generate the fixed coordinate system referenced line-of-sight direction cosine signals $X_S$, $Y_S$ and $Z_S$ as is indicated at 124, 126 and 128, respectively.

Of course, as is indicated by the coast decision blocks 114, 130 and 132, the line-of-sight error rate signals $\dot{X}_S$, $\dot{Y}_S$ and $\dot{Z}_S$ are not updated when the system is in coast. The line-of-sight position signals $X_S$, $Y_S$ and $Z_S$ are, however, updated in accordance with the previously calculated error rate data.

Since the signals being handled by the target tracking error computer 50 are in the form of direction cosines, the output signals $X_S$, $Y_S$ and $Z_S$ are preferably normalized so that the square root of the sum of the squares of these quantities is always equal to one. This process is generally indicated in FIG. 7b at 134 and 136 wherein a normalization constant is computed and each of the line-of-sight error rate and line-of-sight position signals is multiplied by this normalization constant. Normalization of these quantities minimizes the effects of noise on the simulated filter equations. Moreover, the normalized quantities are utilized as starting or initial quantities on the next set of calculations thereby further increasing accuracy. Of course, the normalization process is bypassed when the system is in coast as is indicated at 135.

After the fixed coordinate system referenced line-of-sight error rates $\dot{X}_S$, $\dot{Y}_S$ and $\dot{Z}_S$ and the fixed coordinate system referenced line-of-sight positions $X_S$, $Y_S$ and $Z_S$ have been normalized as is indicated at 136 in FIG. 7b, the line-of-sight error positions (and rates if desired) may then be stored in the operational memory 105 as is illustrated in FIG. 6.

The twist reflector angle error computer 56 of FIG. 6 may thereafter calculate the reflector error signals $\epsilon_{Ad}$ and $\epsilon_{Ed}$ as was previously described utilizing the data stored in the operational memory 105 at a 249 Hz. rate. The 249 Hz. rate results in the application of the error signals $\epsilon_{Ad}$ and $\epsilon_{Ed}$ to the antenna drive unit 18 at a rate of 249 times per second. This high iteration rate permits the use of relatively small drive motors since the high iteration rate does not permit large error signals to build up between successive calculations.

Figure 8:
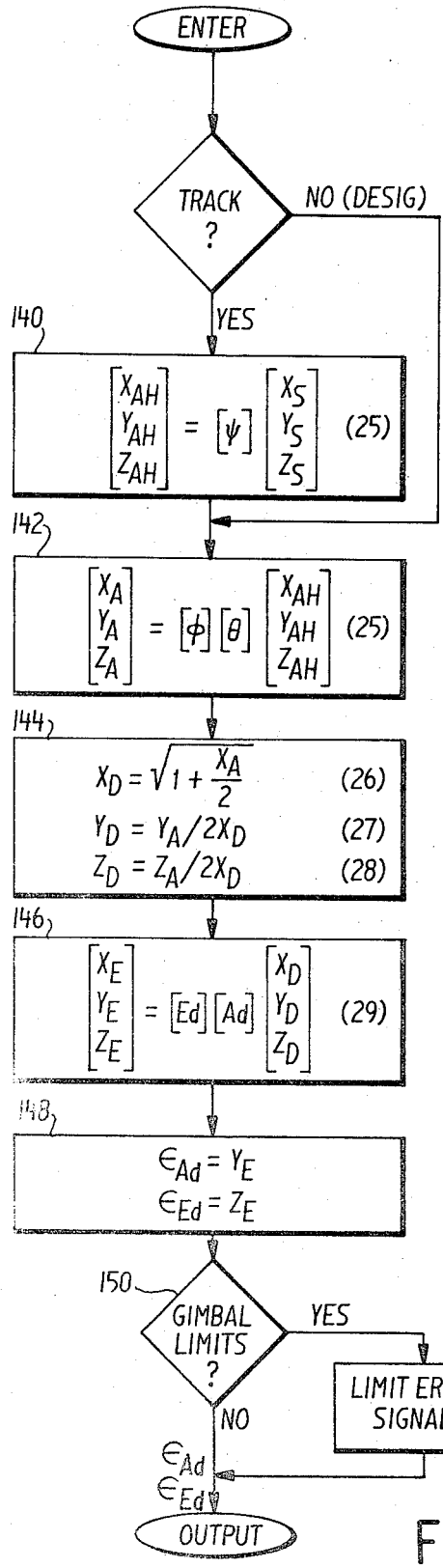

The operation of the digital twist reflector angle error computer 56 may be more easily understood with reference to the reflector angle error computer flow diagram of FIG. 8. Referring now to FIG. 8, and assuming that the system is in track mode, the line-of-sight direction cosine signals $X_S$, $Y_S$ and $Z_S$ referenced to the fixed coordinate system are converted into line-of-sight direction cosine signals referenced to the aircraft coordinate system. This may be accomplished in two steps by first transforming the fixed coordinate system referenced signals $X_S$, $Y_S$ and $Z_S$ into signals $X_{AH}$, $Y_{AH}$ and $Z_{AH}$ referenced to aircraft heading and then transforming the aircraft heading referenced signals into the signals $X_A$, $Y_A$ and $Z_A$ referenced entirely to the aircraft coordinate system as is indicated respectively at 140 and 142. The transformation from the fixed coordinate system into the aircraft coordinate system in this manner permits the designate signal DESIG to take the form of direction cosines which are referenced in azimuth to the aircraft coordinate system while being referenced in elevation and roll to the fixed coordinate system. The DESIG signal may thus be in a form more convenient to the pilot as well as to any scan pattern generator utilized in the control unit 24 of FIG. 1.

After the line-of-sight direction cosine signals $X_S$, $Y_S$ and $Z_S$ have been converted into the aircraft coordinate system as the $X_A$, $Y_A$ and $Z_A$ signals, the commanded direction cosine signals $X_D$, $Y_D$ and $Z_D$ may be calculated as is indicated at 144 and the reflector direction cosine signals $X_E$, $Y_E$ and $Z_E$ may then be calculated as is indicated at 146. As was previously described, the twist reflector error signals $\epsilon_{Ad}$ and $\epsilon_{Ed}$ are approximately equal to the respective values $Y_E$ and $-Z_E$ and may thus be equated to these values as indicated at 148.

The reflector angle error signals $\epsilon_{Ad}$ and $\epsilon_{Ed}$ may be checked, in conjunction with the present twist reflector position angles, to determine whether or not the error signals will drive the twist reflector into its stops. As is indicated at 150, if the error signals will not drive the twist reflector into either its azimuth or elevation stops, the error signals $\epsilon_{Ad}$ and $\epsilon_{Ed}$ are provided as output signals to the antenna drive unit 18 of FIG. 1. If, however, either of these error signals will drive the reflector into a stop, the error signals are limited as indicated at 152 prior to being provided as the output signals $\epsilon_{Ad}$ and $\epsilon_{Ed}$ to the antenna drive unit 18.

Figure 9:
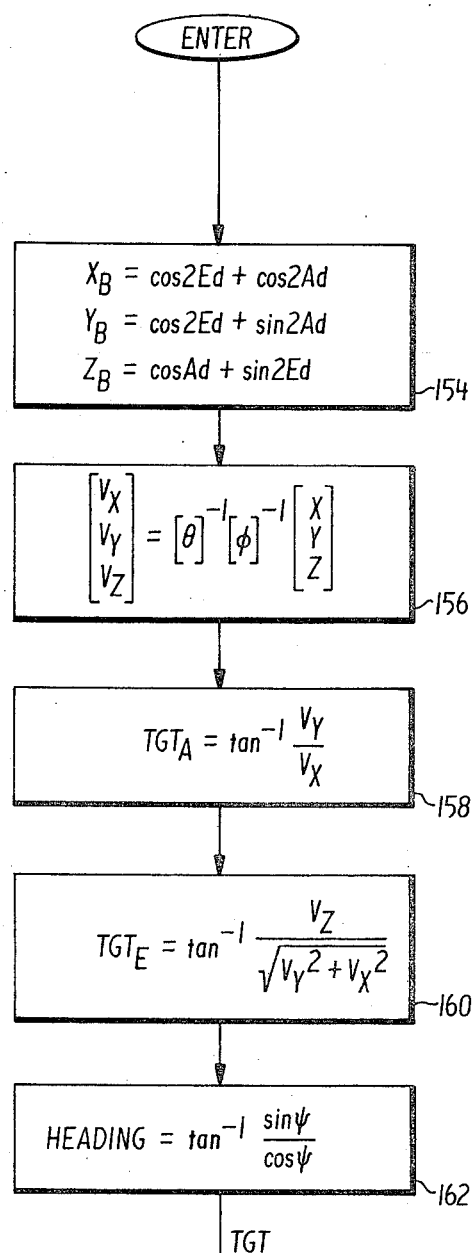

The operation of the antenna monitoring unit 106 of FIG. 6 may be more clearly understood with reference to FIG. 9 wherein a flow diagram of the antenna monitoring unit 106 is provided. Referring now to FIG. 9, the direction cosines of beam position ($X_B$, $Y_B$ and $Z_B$) may be calculated as is indicated at 154. Beam position direction cosines $Vx$, $Vy$, and $Vz$ referenced in elevation and roll to the fixed coordinate system may then be computed as is indicated at 156 and these direction cosine signals $V_X$, $V_Y$ and $V_Z$ may then be utilized to compute target azimuth $TGT_A$ and target elevation $TGT_E$ in a stabilized coordinate system as is indicated at 158 and 160, respectively.

The heading of the target referenced to the aircraft axes may be provided in a suitable manner from the beam position direction cosines and aircraft heading may be calculated as is indicated at 162. The target information and aircraft heading may thereafter be utilized by the display and control unit 24 of FIG. 1 in any suitable conventional manner to provide the pilot with a display of aircraft position, on an indicator panel, for example.

Figure 10:
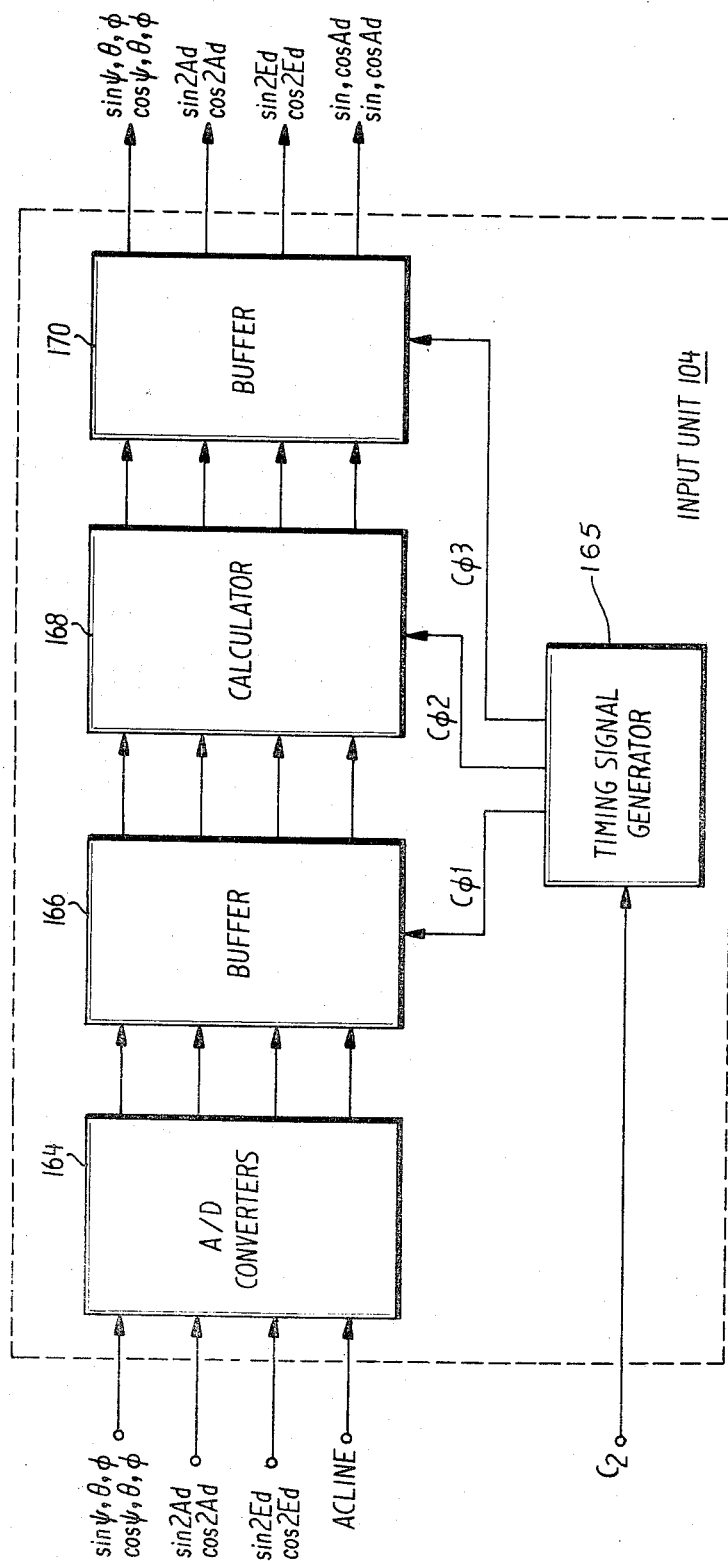
FIG. 10 is a more detailed functional block diagram of the input unit of FIG. 6.

The input unit 104 of FIG. 6 is illustrated in greater detail in FIG. 10. Referring now to FIG. 10, the sines and cosines of the aircraft attitude angles $\psi$, $\theta$ and $\phi$, the sines and cosines of twice the reflector azimuth and elevation positions angles $Ad$ and $Ed$, e.g., sin $2Ad$ and cos $2Ad$, and the signal ACLINE representative of the current value of the a.c. line voltage are applied to suitable conventional analog-to-digital converters 164 for conversion into digital signals. These signals are all preferably taken from resolvers and are not normalized. They may thus be represented as being multiplied by some value $K$ which may vary slightly with variation in supply voltage. The digitized output signals from the analog-to-digital converters 164 preferably each comprise a 12 bit digital word wherein 11 bits represent the value of the particular signal and the 12th bit represents the sign of the signal. These digital signals may be stored in a temporary storage buffer 166 in response to one phase $C\phi1$ of the $C_2$ clock signal generated by delaying the $C_2$ clock signal in a conventional manner in a timing signal generator 165, by way of example and stored by the buffer 166 temporarily.

The digital signals stored by the buffer 166 may be applied to a suitable digital calculator 168 for various preliminary calculations such as the calculation of the sines and cosines of the angles $Ad$ and $Ed$ and for normalization of the input signals as is hereinafter described in greater detail in connection with FIG. 11. The reading of the necessary data out of the buffer 166 may be effected by a second phase $C\phi2$ of the $C_2$ clock signal or in any other suitable manner. The necessary calculations are performed by the calculator 168 and the results of the various calculations may be stored in a buffer memory 170. The buffer memory 166 may, of course, be utilized for this purpose thus eliminating the need for a second buffer memory 170.

After all preliminary calculations have been performed, the normalized aircraft attitude sine and cosine $\psi$, $\theta$ and $\phi$ signals and the normalized twist reflector double angle sine and cosine $2Ad$ and $2Ed$ signals may be simultaneously stored in the operational memory 105 of FIG. 6 in response to a third phase $C\phi3$ of the $C_2$ clock signal. The calculated sines and cosines of the twist reflector angles $Ad$ and $Ed$ may also be stored in the operational memory 105 of FIG. 6 for use in calculating the reflector error signals $\epsilon_{Ad}$ and $\epsilon_{Ed}$ as was previously described. Since a block a data, i.e., a sample of each input signal, is entirely processed and stored in the memory 105 for subsequent use, time skewing of the input data is eliminated and the resulting degradation of the system accuracy is minimized.

The calculator 168 may calculate the sines and cosines of the angles $Ad$ and $Ed$ from the sines and cosines of the double angles $2Ad$ and $2Ed$ in any suitable conventional manner. The normalization of the input data is, however, preferably performed by a normalization calculator illustrated in FIG. 11.

Figure 11:
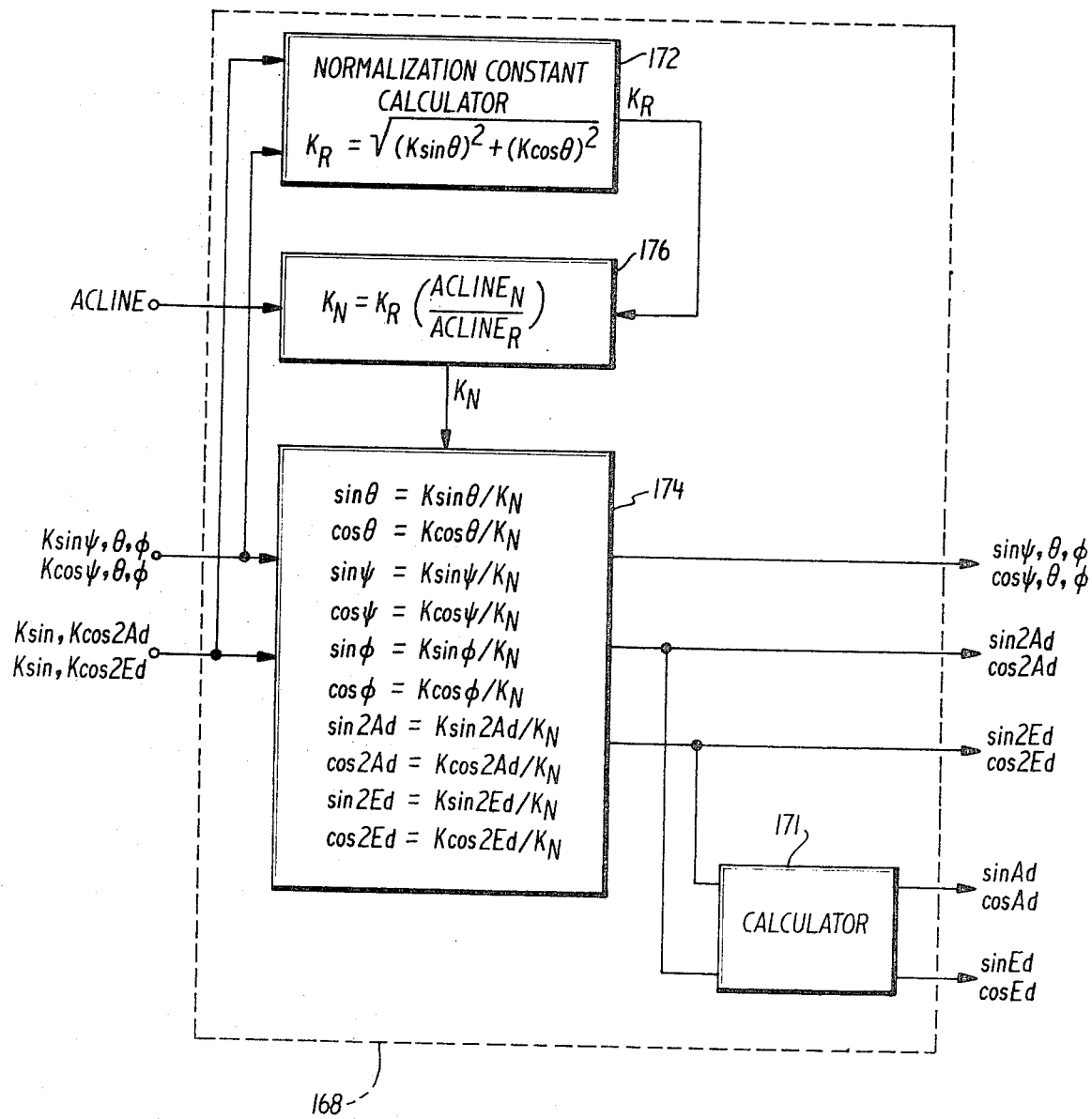
FIG. 11 is a more detailed functional block diagram of the calculator of FIG. 10.

Referring now to FIG. 11, any selected one of the input signals, for example, the sine and cosine of the aircraft elevation angle $\theta$, may be applied to an initial normalization constant calculator 172 and to a divider 174. The signal ACLINE indicative of the amplitude of the a.c. line voltage may be applied to a new normalization constant calculator 176 together with the initial or reference normalization constant output signal $K_R$ from the normalization constant calculator 172. The output signal $K_N$ from the calculator 176 may be applied to the divider 174. The sines and cosines of the aircraft attitude signals $\psi$, $\theta$ and $\phi$ may also be applied to the divider 174 together with the sines and cosines of the double twist reflector angles $2Ad$ and $2Ed$. The normalized sines and cosines of both the aircraft attitude angles and the double twist reflector angles may be provided as output signals from the divider 174 for application to the buffer 170 of FIG. 10. Calculator 171 calculates in any suitable conventional manner the sines and cosines of the angles $Ad$ and $Ed$ from the sines and cosines of the double angles $2Ad$ and $2Ed$ which are taken as output signals from divider 174.

In operation, the un-normalized sines and cosines of the aircraft attitude angles and twist reflector double angles are each applied to the divider 174 for normalization by dividing each signal by a normalization constant. The normalization constant may change slightly each time the input signals are sampled and must therefore be updated for each sample.

The normalization constant $K_N$ may be calculated for each sample by calculating the square root of the sum of the squares of the sine and cosine of each input quantity. However, the process of calculating the square root of the sum of the squares by digital techniques may consume considerable time and/or memory space.

According to the present invention, the square root of the sum of the squares of each angular quantity is calculated initially to generate the reference normalization constant $K_R$. The major fluctuations in the normalization constant are generally caused by changes in the a.c. line voltage. The a.c. line voltage is sampled at the time the first sample is taken and is utilized thereafter, in conjunction with this reference normalization constant $K_R$, as a reference line voltage with which to compute a new normalization constant $K_N$ for each sample. Thus, for each new sample, a new normalization constant $K_N$ may be calculated by multiplying the reference normalization constant $K_R$ by the ratio of the new line voltage ACLINE$_N$ to the reference line voltage ACLINE$_R$. This new normalization constant $K_N$ may be calculated for each sample utilizing the reference values obtained with the first sample thereby obviating the need for calculating the square root of the sum of the squares in the normalization constant calculator 172 on every sample subsequent to the first sample. To ensure accuracy, however, new reference values $K_R$ and $ACLINE_R$ may be obtained on a regular basis after a predetermined number of samples. These new reference values may be obtained for each of the input quantities at different sampling times so that during any one sampling period, the reference constant $K_R$, i.e., the square root of the sum of the squares, need only be calculated for one input quantity. The preliminary calculation time thus is approximately the same for every sample.

Figure 12:
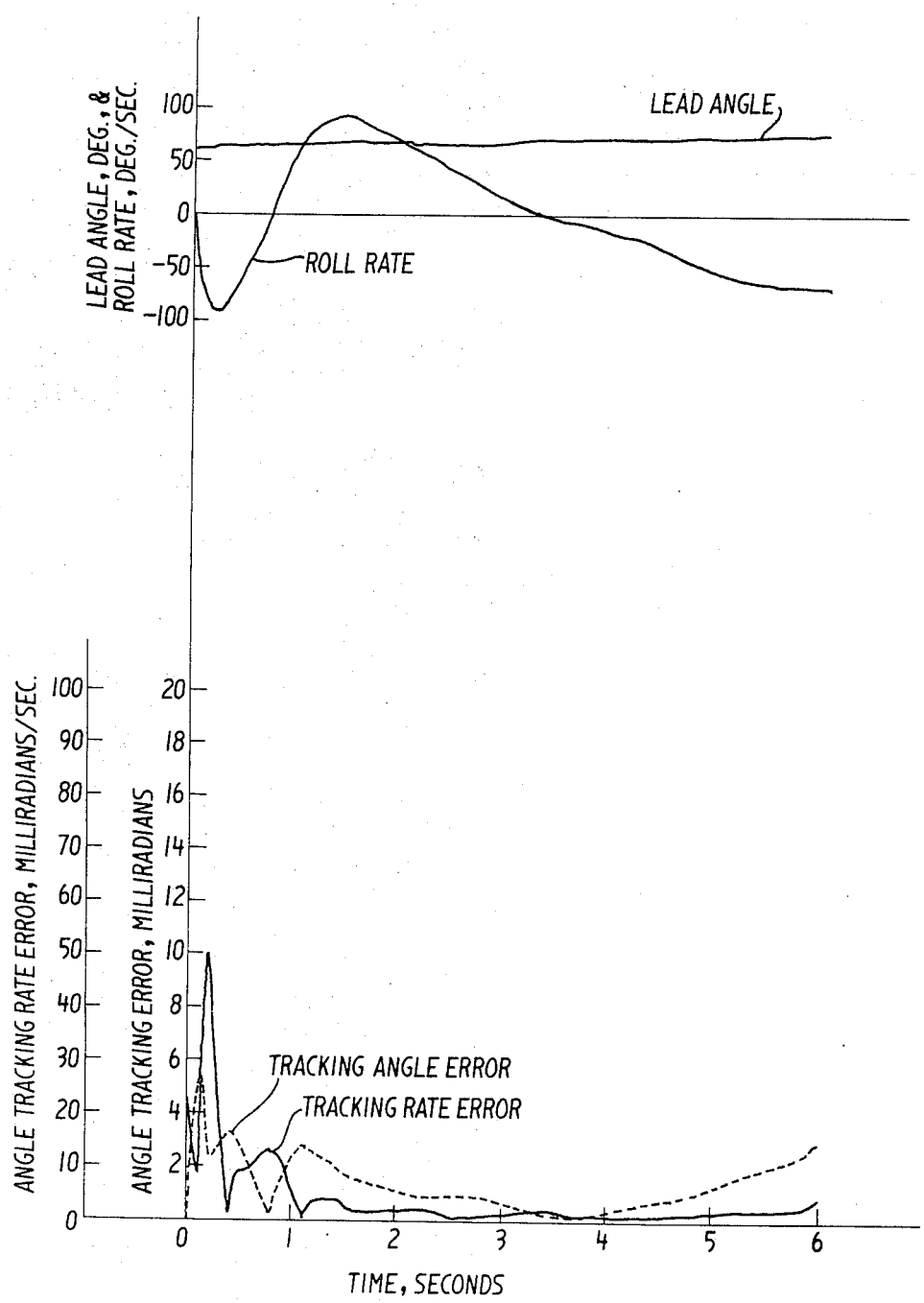
FIG. 12 is a graph illustrating simulated response characteristics of a conventional radar antenna positioning system employing rate gyros.
Figure 13:
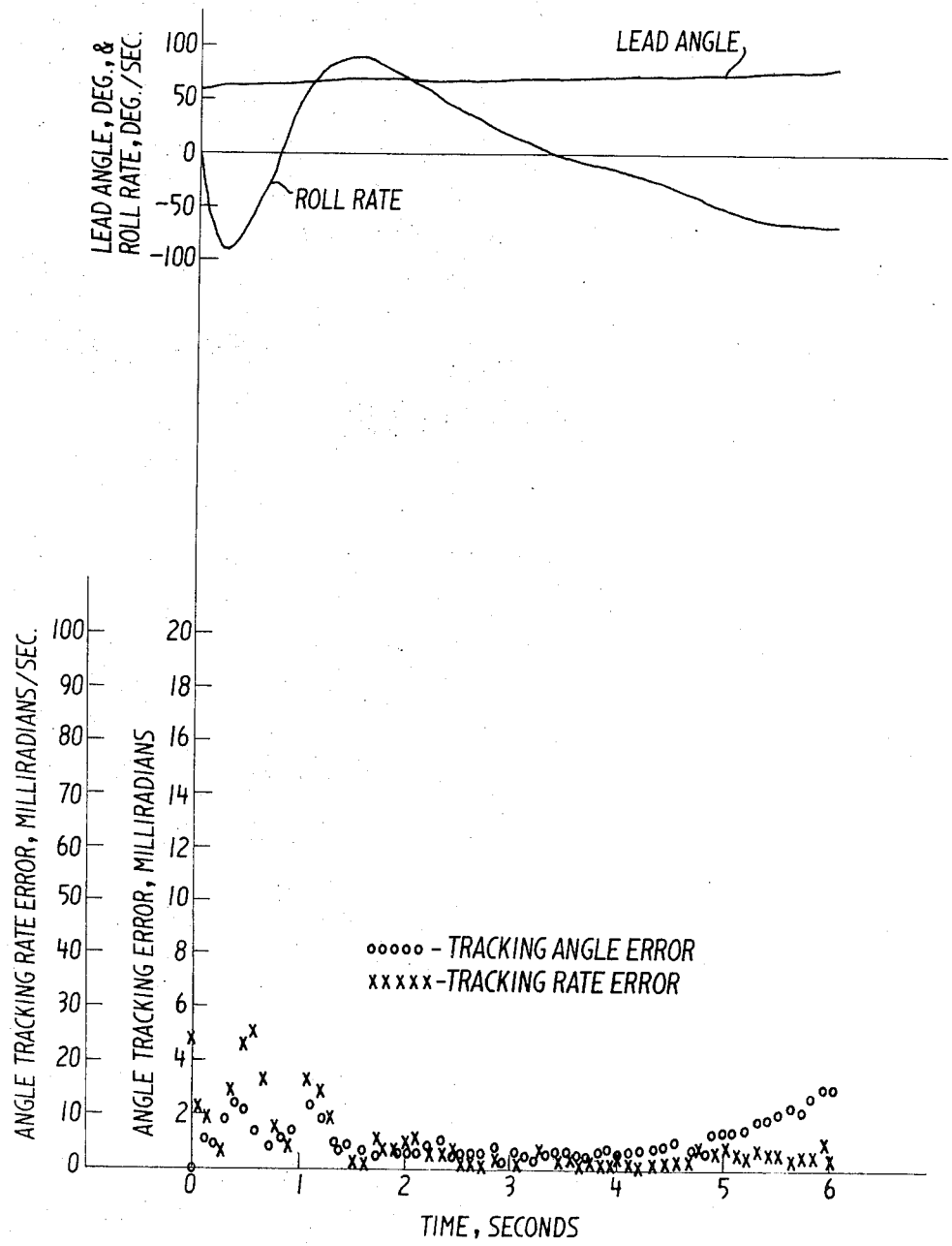
FIG. 13 is a graph illustrating simulated response characteristics of the positioning system of the present invention implemented with analog techniques.

FIGS. 12 and 13 graphically illustrate the respective simulated response characteristics of a conventional system employing rate gyros and the digital implementation of the system of the present invention simulated at a computation rate of 200Hz. It can be seen that in each simulation that identical aircraft lead angles and roll rates were chosen for each simulation and that the resulting angle tracking characteristics with respect to time are substantially identical.

Moreover, it should be noted that the lead angle in each simulation was chosen such that the target line-of-sight rate was very small. Under these conditions the characteristics illustrated in FIGS. 12 and 13 look alike except for the fact that the graph of FIG. 13 illustrating the digital system comprises discrete values rather than a continuous curve. However, it was found that under more adverse conditions, the tracking characteristics of the invention were clearly better than those of the rate gyro system.

It is thus apparent that the system performs tracking functions approximating those of systems employing rate gyros and, under extremely adverse conditions, actually out performs the conventional rate gyro system. The need for rate gyros in the tracking loop is eliminated and considerable weight and space savings are effected.

While the present invention has been described in connection with a radar system employing a cassegrain antenna, it should be noted that the system of the invention may also be employed in connection with radar systems utilizing "non-cassegrain" antenna systems, i.e., antenna systems wherein beam position is directly related to the position of the antenna. For such a use, the derotation function $C$ of the $[T]$ matrix need not be utilized and the quantities $\epsilon_a$ and $\epsilon_e$, i.e., beam position angles in aircraft coordinates, employed throughout the system in lieu of the angles $Ed$ and $Ad$ employed in solving the cassegrain antenna problem. Moreover, the command direction cosine calculator 82 need not be provided since $X_DDY_D$ and $Z_D$ are equal, respectively, to $X_A$, $Y_A$ and $Z_A$ in the "non-cassegrain" systems.

Thus, employing the digital system of the present invention in either a cassegrain or a "non-cassegrain" antenna system eliminates the need for rate gyros and provides greater capabilities than systems employing rate gyros. For example, the present invention virtually eliminates large tracking lags which occur in systems using rate gyros in the tracking loop when, for example, high aircraft roll values are encountered. Moreover, the high iteration rate minimizes drive motor size requirements and the various digital techniques such as the disclosed data input, normalization and double angle techniques provide highly accurate results.

It should further be noted that the system of the invention, although dscribed utilizing direction cosines for the angular calculations, may employ any convenient angular system. Direction cosines are, however, particularly advantageous since certain poles which cause problems in a system wherein positions are defined by two angles are eliminated through the use of direction cosines.

The present invention may thus be embodied in other specific forms without departing from the spirit or essential characteristics thereof. For example, the described functions may be implemented essentially as disclosed in the form of a hard-wired special purpose digital computer or in the form of a general purpose digital computer properly programmed by one skilled in the art given the foregoing description. The presently disclosed digital embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of positioning an aircraft radar system antenna comprising the steps of:
    a. generating analog signals representing aircraft attitude and antenna position;
    b. simultaneously converting all of said analog signals to digital signals and temporarily storing said digital signals;
    c. performing preliminary calculations utilizing said digital signals;
    d. temporarily storing the results of all of the preliminary calculations in a buffer memory as digital data signals;
    e. transferring all of the digital data signals from the buffer memory into an operational memory to prevent time skewing of the digital data signals;
    f. generating a digital initialization signal representing a radar beam line-of-sight relative to a predetermined beam line-of-sight axis system;
    g. generating a digital error signal representing an angular error between the radar beam line-of-sight and a target line-of-sight referenced to the predetermined beam line-of-sight axis system;
    h. referencing said error signal and the initialization signal to a predetermined fixed coordinate system in response to the digital data signals stored in the operational memory;
    i. periodically generating, in response to the fixed coordinate system referenced initialization and error signals, a digital line-of-sight position signal representing the angular position of the target line-of-sight relative to the fixed coordinate system; and
    j. periodically driving the antenna in response to the line-of-sight position signal and the digital data signals in a direction tending to null the generated error signal.

2. Apparatus for positioning an antenna of a radar system mounted on a movable platform having a platform axis system comprising:
    means for generating signals representing platform attitude relative to a fixed coordinate system;
    means for generating signals representing antenna position relative to said platform axis system, said generated signals being related in amplitude to a reference voltage;

means for simultaneously sampling all of said generated signals and said reference voltage as a first block of data signals;

means for temporarily storing said block of data signals at a first time;

means for generating a first normalization constant for said first block of data signals in response to the square root of the sum of the squares of each of the data signals in said first block of data signals;

means for normalizing each of said data signals in the first block of data signals in response to said first normalization constant generating means;

buffer memory means for temporarily storing each of said normalized data signals until all normalized data signals of said block of data signals are stored;

operational memory means;

means for transferring all of said normalized data signals as a block of normalized data signals from said buffer memory means into said operational memory means; and, means responsive to said block of normalized data signals stored in said operational memory means for generating antenna positioning signals.

3. The apparatus of claim 2 including means for generating a normalization constant for a subsequent block of data signals subsequent to said first block of data signals by varying the value of said first generated normalization constant in proportion to the ratio of the value of said reference voltage in said subsequent block of data signals to said first sampled reference voltage.

4. The apparatus of claim 3 wherein said means for generating signals representing antenna position includes means for generating signals representing the sines and cosines of twice the antenna position signals whereby the resolution of the generated antenna positioning signals is improved.

5. Apparatus for positioning an aircraft radar system antenna comprising:

means for providing analog signals representing aircraft attitude and antenna position;

an analog-to-digital converter for simultaneously converting all of said analog signals to digital signals;

first storage means for temporarily storing said digital signals;

means for generating digital data signals in response to said digital signals;

second storage means for temporarily storing said preliminary digital data signals;

third storage means;

means for transferring all of said preliminary digital data signals from said second storage means into said third storage means to prevent time skewing of the preliminary digital data signals;

means for generating a digital initialization signal representing a radar beam line-of-sight relative to a predetermined beam line-of-sight axis system;

means for generating a digital error signal representing an angular error between the radar beam line-of-sight and a target line-of-sight referenced to the predetermined beam line-of-sight axis system;

means for referencing said digital error signal and said digital initialization signal to a predetermined fixed coordinate system in response to the preliminary digital data signals stored in said third storage means;

means for periodically generating, in response to said fixed coordinate system referenced digital initialization and error signals, a digital line-of-sight position signal representing the angular position of the target line-of-sight relative to the fixed coordinate system; and, means for periodically driving the antenna in response to said line-of-sight position signal and said preliminary digital data signals in a direction tending to null said generated error signal.

* * * * *